United States Patent
Sheffer et al.

(10) Patent No.: US 11,104,421 B2
(45) Date of Patent: Aug. 31, 2021

(54) AUTOPILOT SYSTEM, AND RELATED COMPONENTS AND METHODS

(71) Applicants: Tzafrir Sheffer, Seattle, WA (US); Yarden Sheffer, Shoreline, WA (US)

(72) Inventors: Tzafrir Sheffer, Seattle, WA (US); Yarden Sheffer, Shoreline, WA (US)

( * ) Notice: Subject to any disclaimer, the term of this patent is extended or adjusted under 35 U.S.C. 154(b) by 0 days.

(21) Appl. No.: 16/776,367

(22) Filed: Jan. 29, 2020

(65) Prior Publication Data

US 2020/0317326 A1   Oct. 8, 2020

Related U.S. Application Data

(62) Division of application No. 15/520,788, filed as application No. PCT/US2015/055576 on Oct. 14, 2015, now Pat. No. 10,589,845.

(Continued)

(51) Int. Cl.
| | |
|---|---|
| *B64C 13/18* | (2006.01) |
| *B64C 13/04* | (2006.01) |
| *B64C 13/22* | (2006.01) |
| *B64D 43/02* | (2006.01) |
| *G05D 1/08* | (2006.01) |

(Continued)

(52) U.S. Cl.
CPC ............ *B64C 13/18* (2013.01); *B64C 9/02* (2013.01); *B64C 13/04* (2013.01); *B64C 13/0423* (2018.01); *B64C 13/0427* (2018.01); *B64C 13/22* (2013.01); *B64D 43/02* (2013.01); *G05D 1/0808* (2013.01); *G01S 19/13* (2013.01)

(58) Field of Classification Search
CPC ......... B64C 13/22; B64C 27/57; B64C 27/59; B64C 13/18; B64C 13/0427; B64C 13/0423; B64C 9/02; B64C 13/04; B64D 43/02; G05D 1/0808; G01S 19/13
See application file for complete search history.

(56) References Cited

U.S. PATENT DOCUMENTS

| | | |
|---|---|---|
| 3,746,284 A | 7/1973 | Farr et al. |
| 4,597,349 A | 7/1986 | Dolfi |

(Continued)

FOREIGN PATENT DOCUMENTS

FR           3063785 A1 *   9/2018    ............... B64C 9/02

*Primary Examiner* — Jonathan C Weber
(74) *Attorney, Agent, or Firm* — Janeway Patent Law PLLC; John M. Janeway

(57) ABSTRACT

A device for releasably mounting an autopilot control circuit to a flight control component of an aircraft, includes a frame that holds a component of an autopilot control circuit; a first coupler releasably fastened to the frame and operable to releasably mount the frame to the airframe of an aircraft; and a second coupler releasably fastened to the frame and operable to releasably mount the frame to a flight control component of the aircraft. When the device is releasably mounted in an aircraft's cabin and the autopilot control circuit is engaged, the autopilot control circuit controls an aspect of the aircraft's flight by moving the second coupler relative to the first coupler. With the device one can releasably mount an autopilot control circuit to an aircraft that does not have one and use the autopilot control circuit and device to control one or more aspects of the aircraft's flight. Then, after the flight is finished, one can remove the device and autopilot control circuit for use in another aircraft.

7 Claims, 20 Drawing Sheets

Related U.S. Application Data

(60) Provisional application No. 62/075,528, filed on Nov. 5, 2014.

(51) Int. Cl.
    *B64C 9/02*     (2006.01)
    *G01S 19/13*     (2010.01)

(56) References Cited

U.S. PATENT DOCUMENTS

| | | |
|---|---|---|
| 5,456,428 A | 10/1995 | Hegg |
| 5,868,359 A | 2/1999 | Cartmell et al. |
| 7,740,207 B2 | 6/2010 | Ferraz |
| 9,245,453 B1 | 1/2016 | Macalister |
| 9,352,824 B2 | 5/2016 | Piotrowski |
| 9,771,142 B2 | 9/2017 | O'Dell |
| 2012/0255386 A1* | 10/2012 | Couderc ................ B64C 27/54 |
| | | 74/471 XY |
| 2013/0345907 A1 | 12/2013 | Meret et al. |
| 2014/0027564 A1* | 1/2014 | Mercer ................ G05D 1/0077 |
| | | 244/17.13 |
| 2015/0197329 A1 | 7/2015 | Fong et al. |
| 2017/0253320 A1* | 9/2017 | Baran ................ B64C 13/503 |

* cited by examiner

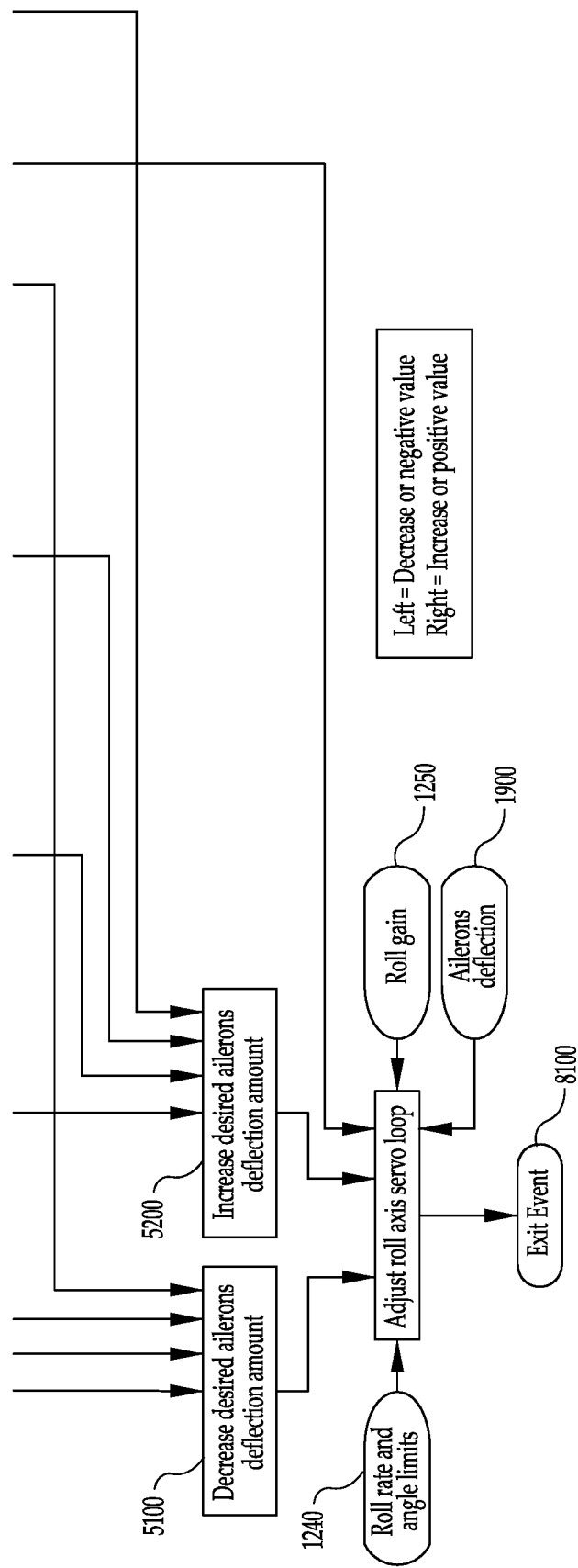

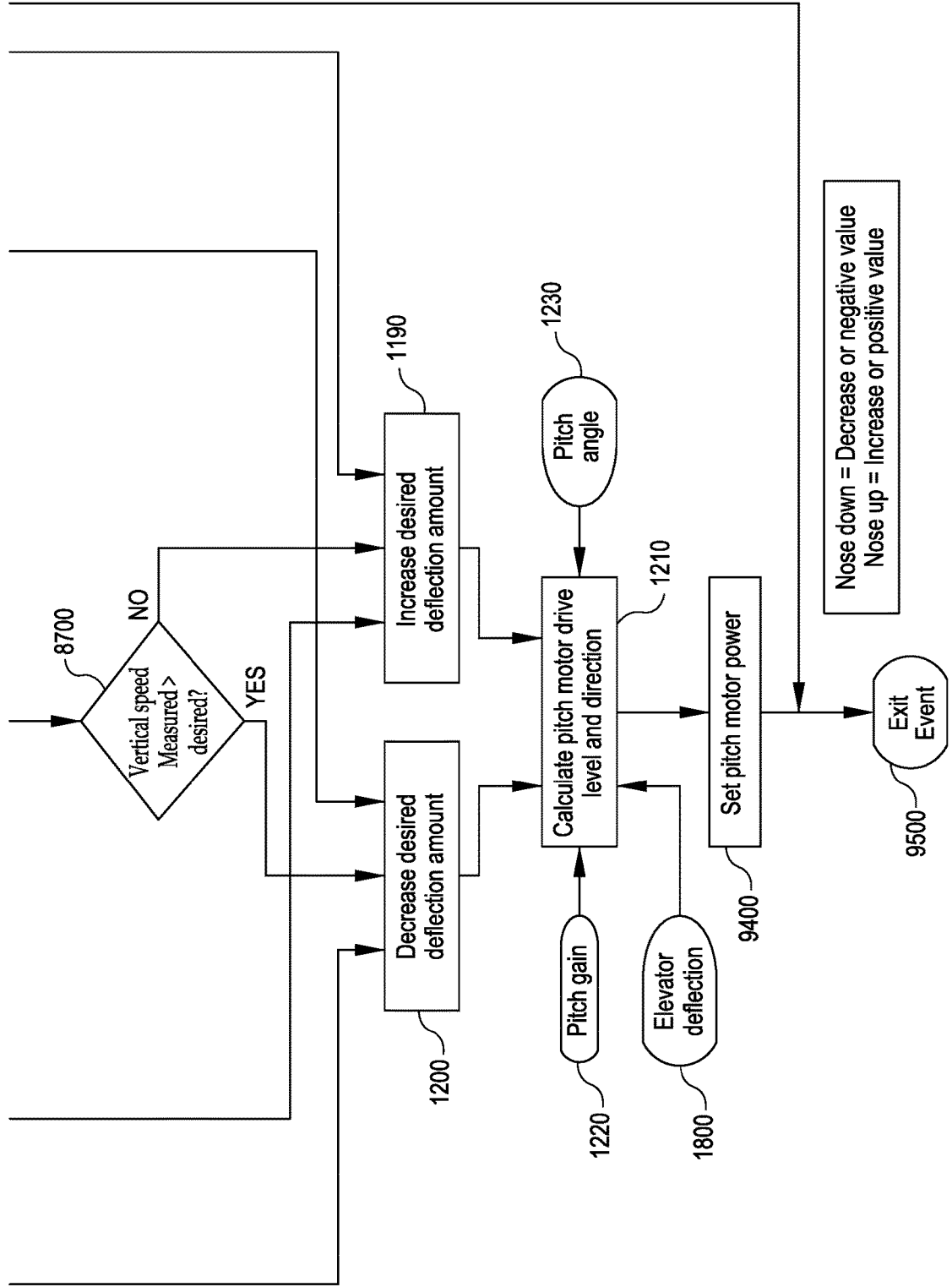

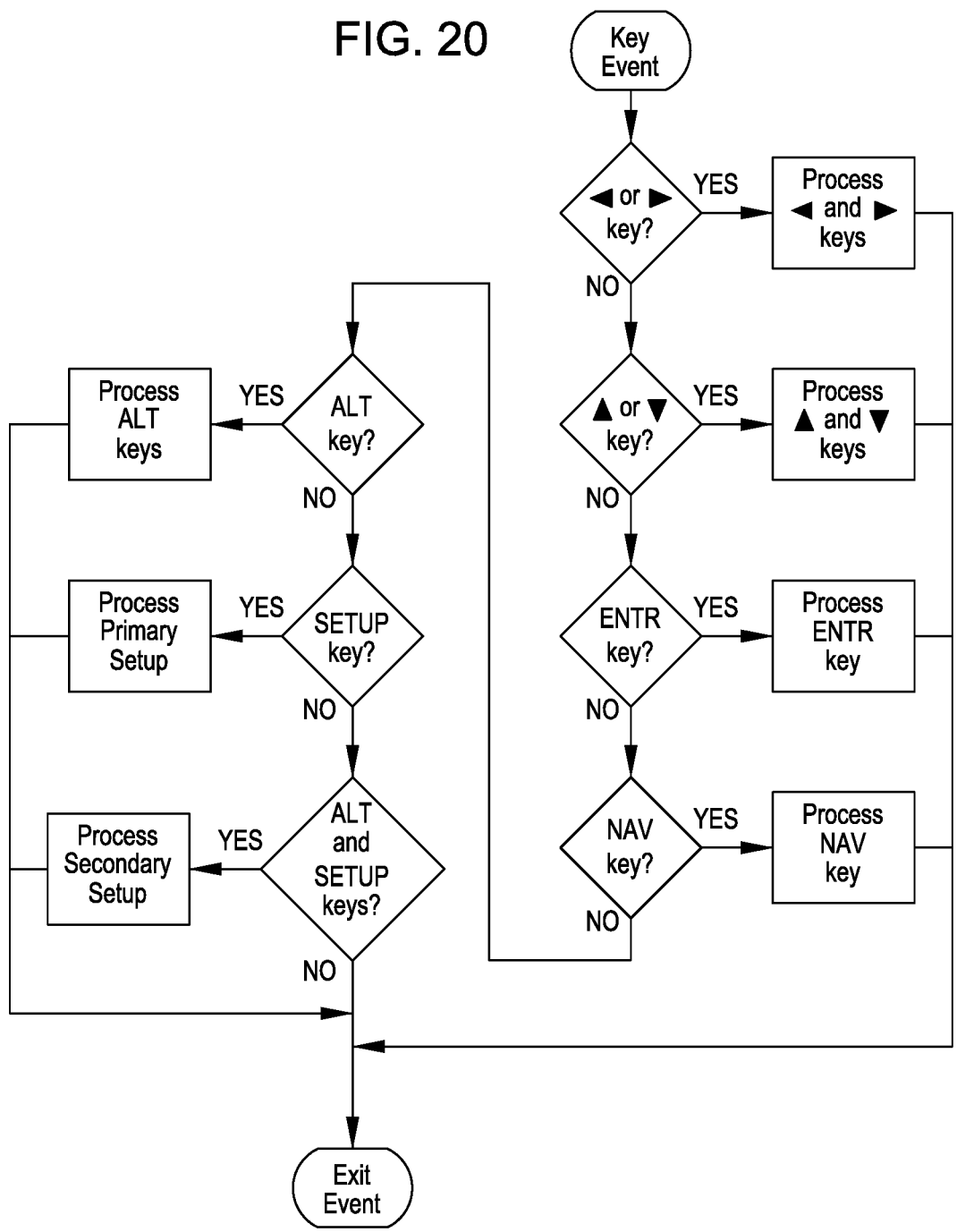

AUTOPILOT SYSTEM, AND RELATED COMPONENTS AND METHODS

CROSS REFERENCE TO RELATED APPLICATION AND CLAIM OF PRIORITY

This application claims priority from commonly owned U.S. Provisional Patent Application 62/075,528 filed 5 Nov. 2014 and titled "Portable Autopilot Technology"; PCT Patent Application PCT/US2015/055576 filed 14 Oct. 2015 and titled "Autopilot System, and Related Components and Methods"; and U.S. Utility patent application Ser. No. 15/520,788 filed 20 Apr. 2017 and titled "Autopilot System, and Related Components and Methods" (now U.S. Pat. No. 10,589,845); each of which are incorporated by reference.

BACKGROUND

An autopilot is a system that controls the trajectory of an aircraft without a human pilot's constant input or 'hands-on' control. Three types of autopilots are commonly available—single-axis autopilots, two-axis autopilots, and three-axis autopilots. Single-axis autopilots control an aircraft's roll or rotation about the aircraft's roll axis. Single-axis autopilots typically control an aircraft's ailerons. Two-axis autopilots control an aircraft's pitch or rotation about the aircraft's pitch axis in addition to an aircraft's roll. Two-axis autopilots typically control independently an aircraft's ailerons and elevator or stabilator. And three-axis autopilots control an aircraft's yaw or rotation about the aircraft's yaw axis in addition to an aircraft's roll and pitch. Three-axis autopilots typically control independently an aircraft's rudder, ailerons and elevator.

Because autopilots automate one or more aspects of controlling an aircraft during flight, autopilots relieve human pilots of continually holding an aircraft's flight controls, such as an aircraft's control yoke or stick, which can be very tiring on long flights. When a pilot is allowed to divert some of his/her attention away from some of the aircraft's flight controls, the pilot can focus on other aspects of the flight, such as plotting a new course to avoid an approaching storm, and/or rest. Thus, autopilots frequently enhance flight safety by reducing a pilot's workload and fatigue. Autopilots can also improve flight efficiency in terms of time and fuel.

Many commercial jet airliners and corporate aircraft with five or more seats have an autopilot that a human pilot can use while flying the aircraft. Unfortunately, though, many smaller, private, general aviation aircraft do not have an autopilot. Often this is because an autopilot is expensive and complex to purchase and install in an aircraft. For older aircraft such cost may exceed the value of the aircraft.

Thus, there is a need for a portable, low-cost autopilot that may be releasably mounted in an aircraft, used during a flight, and then, if desired, removed from the aircraft for use in another aircraft. Furthermore, there is a need for an autopilot that may be releasably mounted in a variety of different aircraft types and models.

SUMMARY

In an aspect of the invention, a device for releasably mounting an autopilot control circuit to a flight control component of an aircraft, includes a frame that holds a component of an autopilot control circuit; a first coupler releasably fastened to the frame and operable to releasably mount the frame to the airframe of an aircraft; and a second coupler releasably fastened to the frame and operable to releasably mount the frame to a flight control component of the aircraft. The autopilot control circuit may be any of the control circuits discussed elsewhere in this application, or the autopilot control circuit may be any other desired control circuit. In addition, the device may hold two or more autopilot control circuits. Such as one to control an aircraft's roll and another to control an aircraft's pitch. When the device is releasably mounted in an aircraft's cabin and the autopilot control circuit is engaged, the autopilot control circuit controls an aspect of the aircraft's flight by moving the second coupler relative to the first coupler, thus moving the aircraft's flight control component that is releasably coupled to the second coupler relative to the aircraft's airframe that is releasably coupled to the first coupler.

With the device one can releasably mount an autopilot control circuit to an aircraft that does not have one and use the autopilot control circuit and device to control one or more aspects of the aircraft's flight. Then, after the flight is finished, one can remove the device and autopilot control circuit for use in another aircraft. This allows the pilot to enhance the safety of his flight by reducing his workload and fatigue, especially during longer flights, and improve flight time and fuel efficiency. In addition, in aircraft that already have an autopilot system, the additional device and autopilot control circuit can provide a redundant autopilot system should the original autopilot system not work properly.

In another aspect of the invention, a method for controlling the flight of an aircraft via an autopilot control circuit includes releasably mounting to an airframe of an aircraft a first coupler of a device that holds a component of an autopilot system; releasably mounting to a flight control component of the aircraft a second coupler of the device; and moving a first portion of a frame of the device relative to a second portion of the device's frame, wherein the frame's first portion is releasably fastened to the first coupler, and the frame's second portion is releasably fastened to the second coupler.

Figure 1:
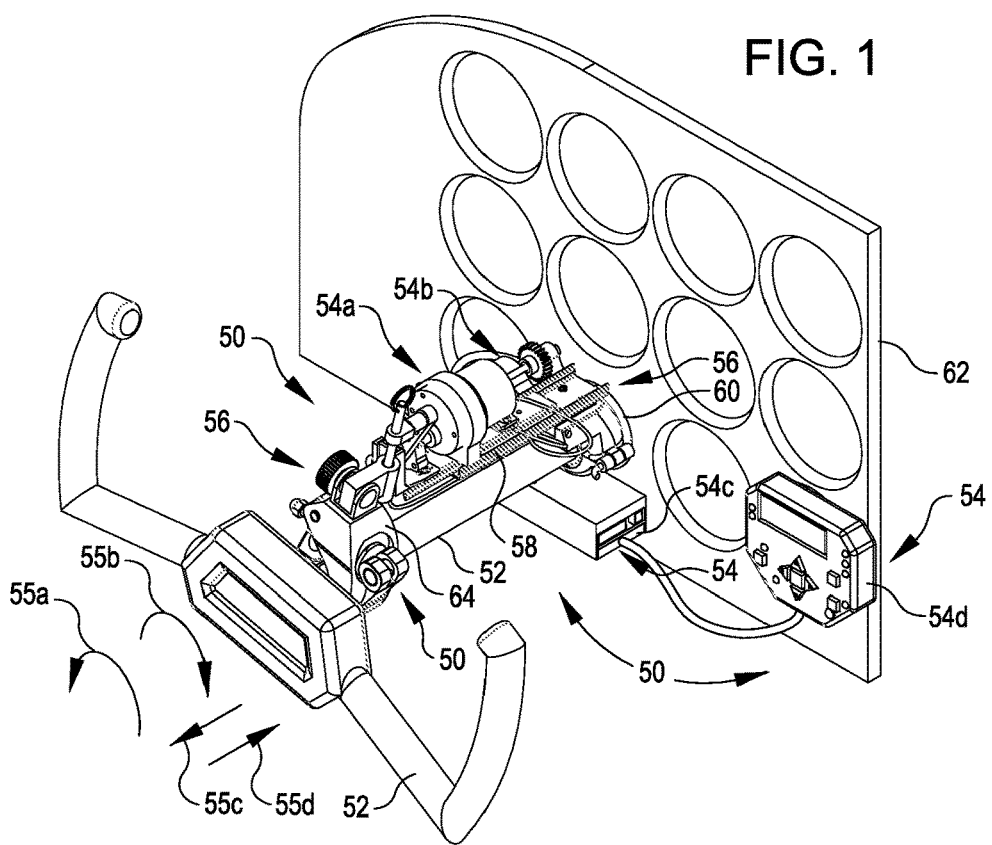
FIG. 1 shows a perspective view of an autopilot system releasably mounted to a control yoke in a cabin of an aircraft, according to an embodiment of the invention.
Figure 2:
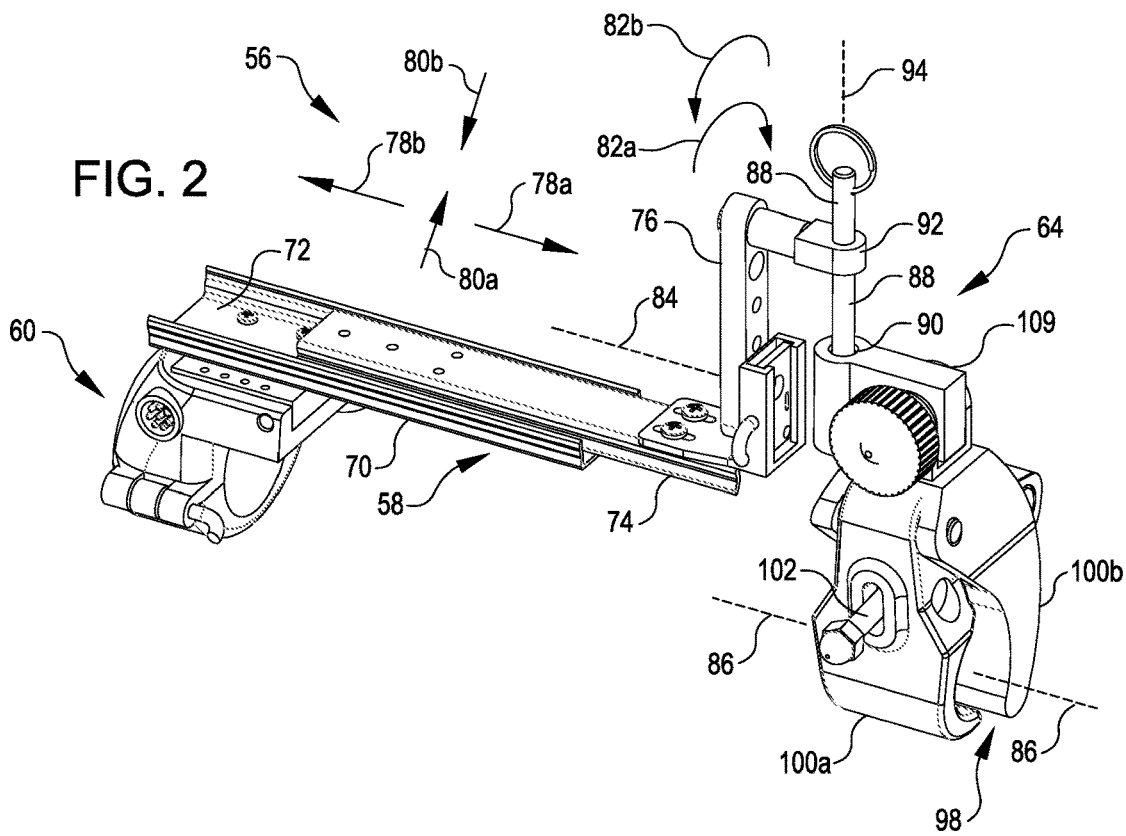
FIG. 2 shows a perspective view of a device of the autopilot system in FIG. 1 for releasably mounting a component of an autopilot control circuit to the control yoke, according to an embodiment of the invention.
Figure 3:
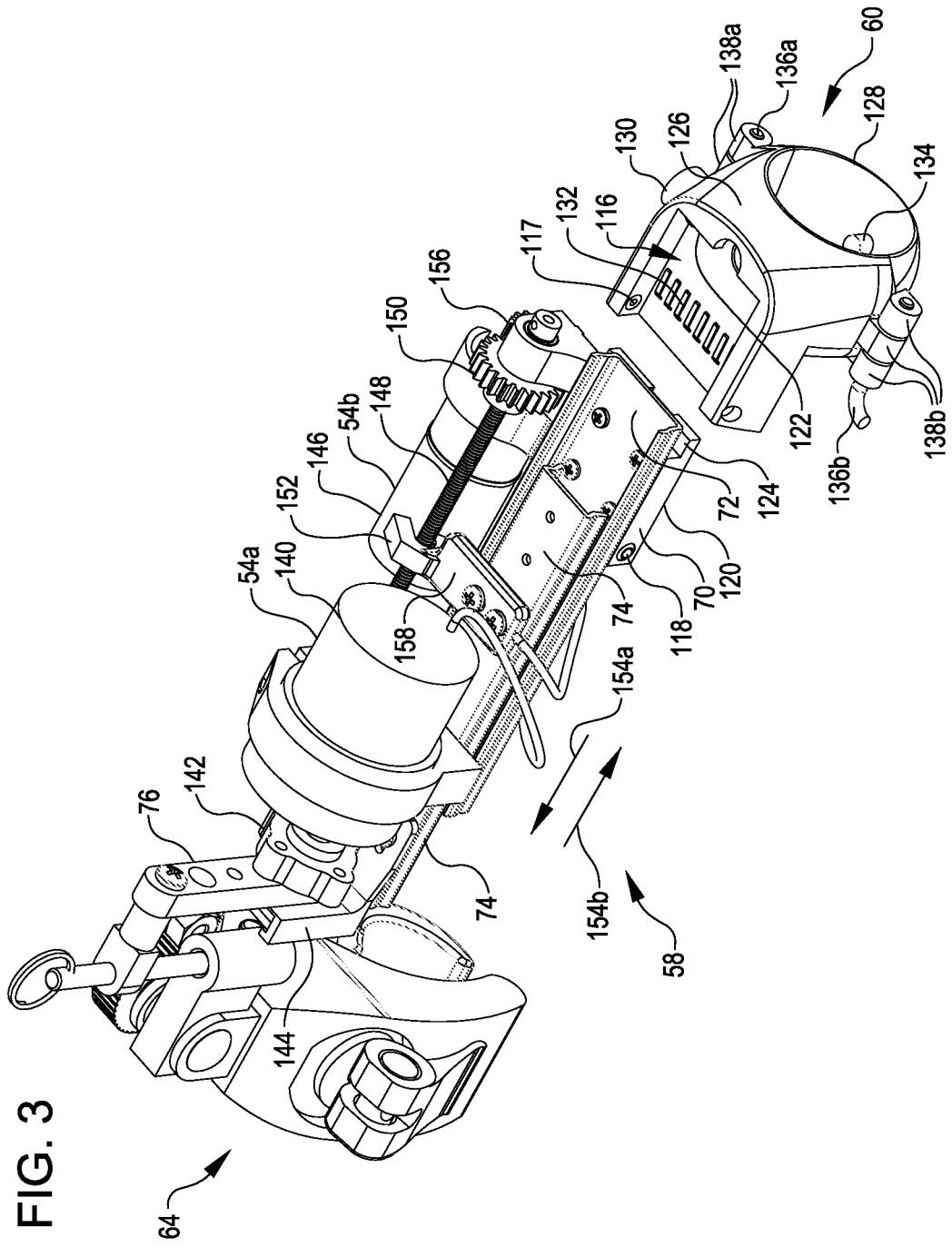
FIG. 3 shows a perspective view of the device in FIGS. 1 and 2, and a component of an autopilot control circuit of the autopilot system shown in FIG. 1, each according to an embodiment of the invention.
Figure 4A:
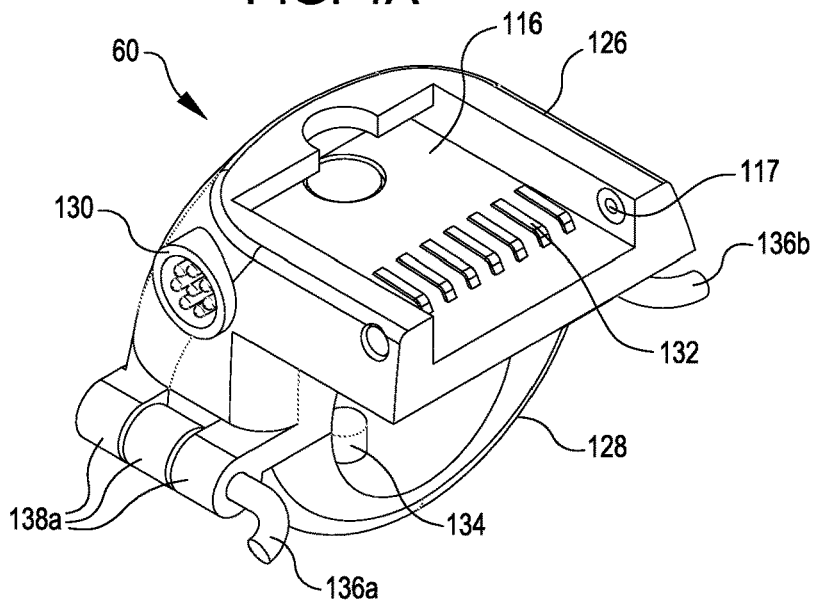
Figure 4B:
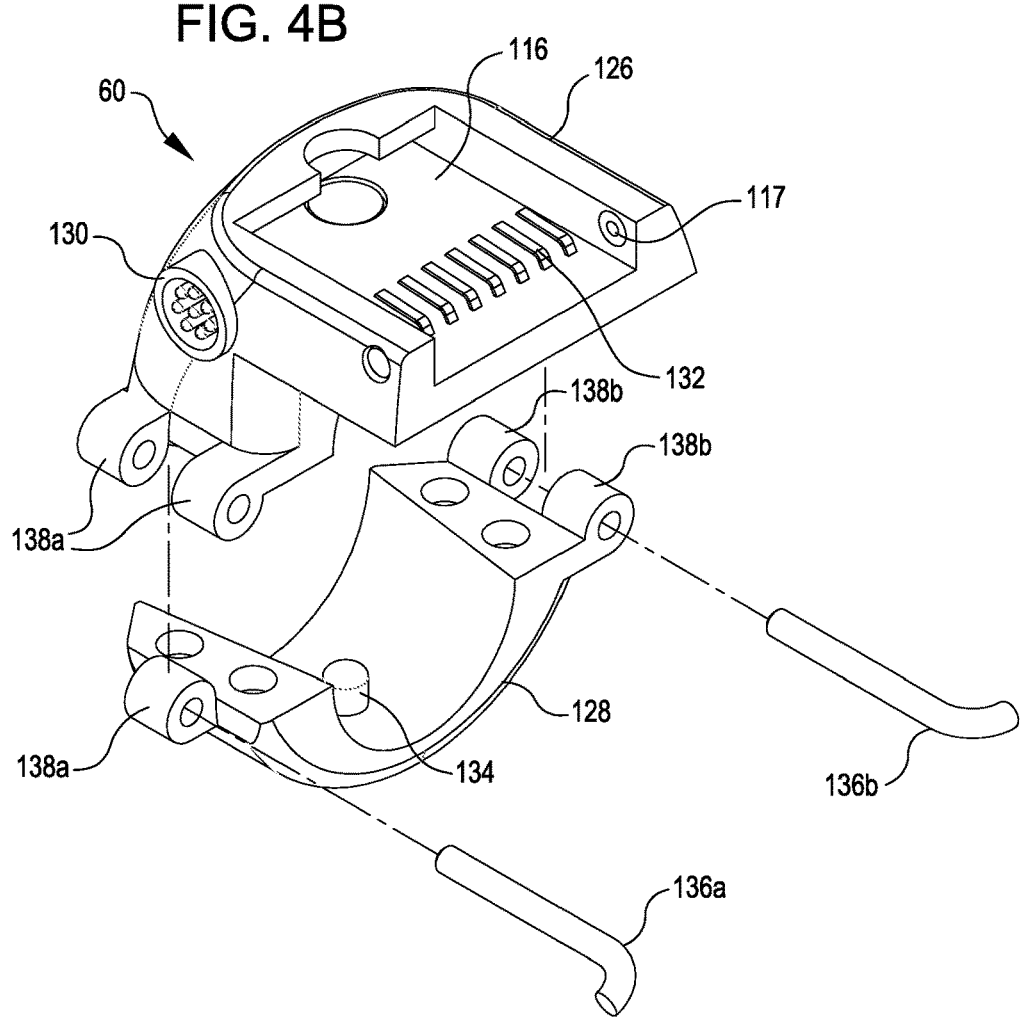

Each of the FIGS. 4A and 4B shows a perspective view of a first coupler of the device shown in FIGS. 1-3, according to an embodiment of the invention.

Figure 4C:
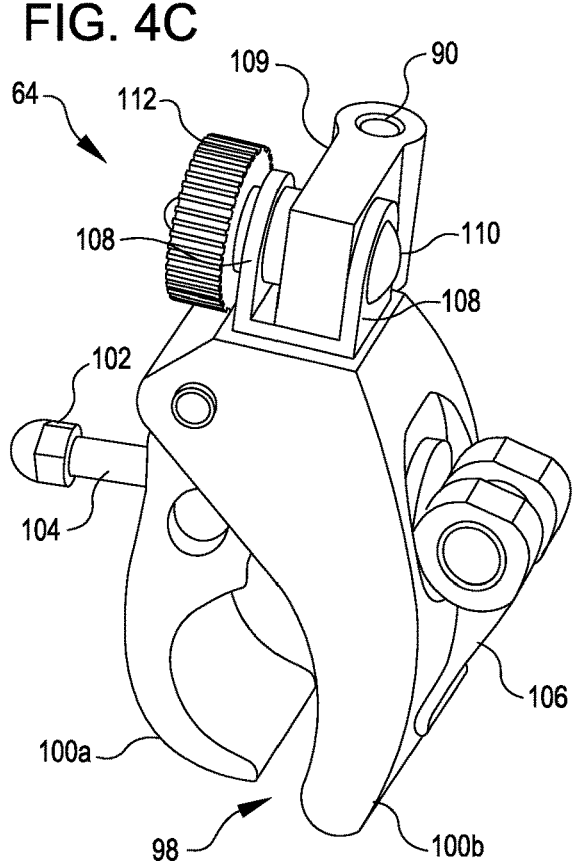
Figure 4D:
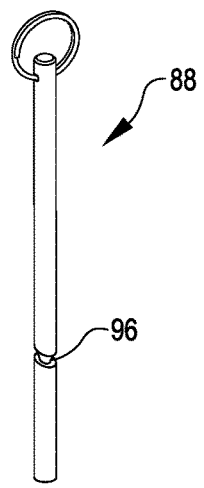

Each of the FIGS. 4C and 4D shows a perspective view of a second coupler of the device shown in FIGS. 1-3, according to an embodiment of the invention.

Figure 5:
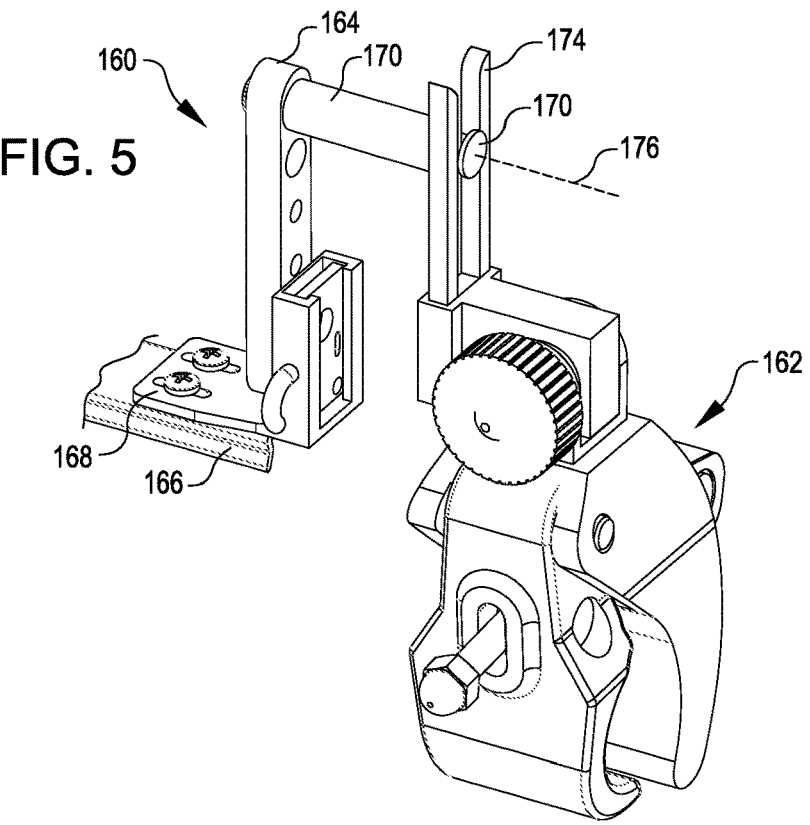

FIG. 5 shows a perspective view of a portion of a device of the autopilot system in FIG. 1 for releasably mounting a component of an autopilot control circuit to the control yoke, according to another embodiment of the invention.

Figure 6:
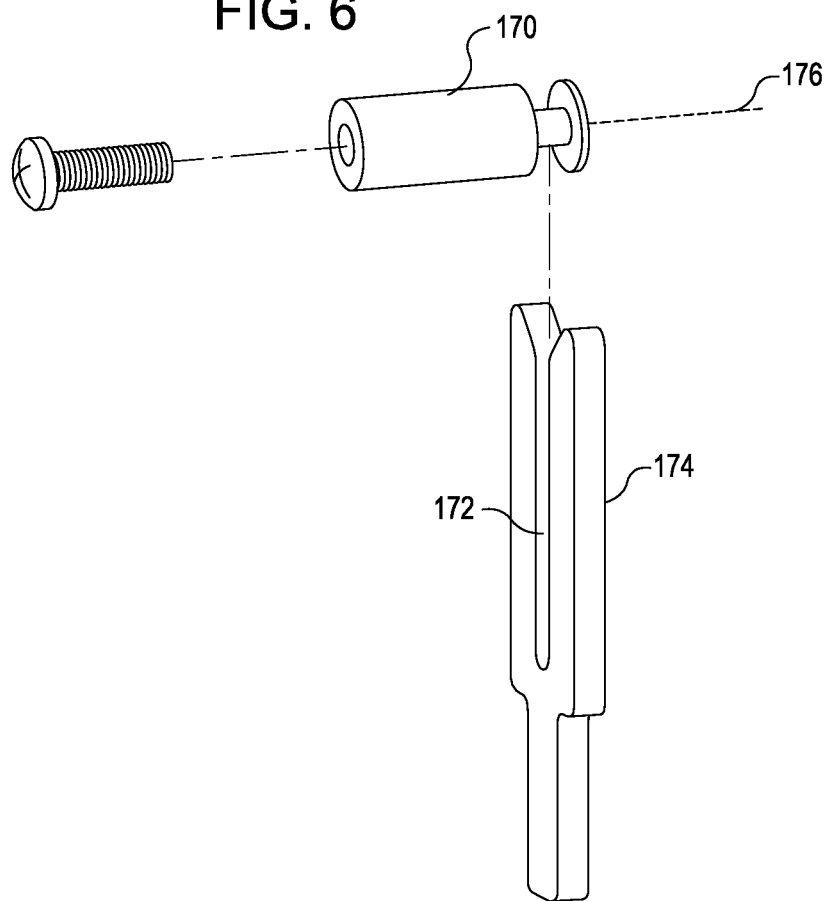

FIG. 6 shows a perspective, exploded view of a portion of the device shown in FIG. 5, according to an embodiment of the invention.

Figure 7:
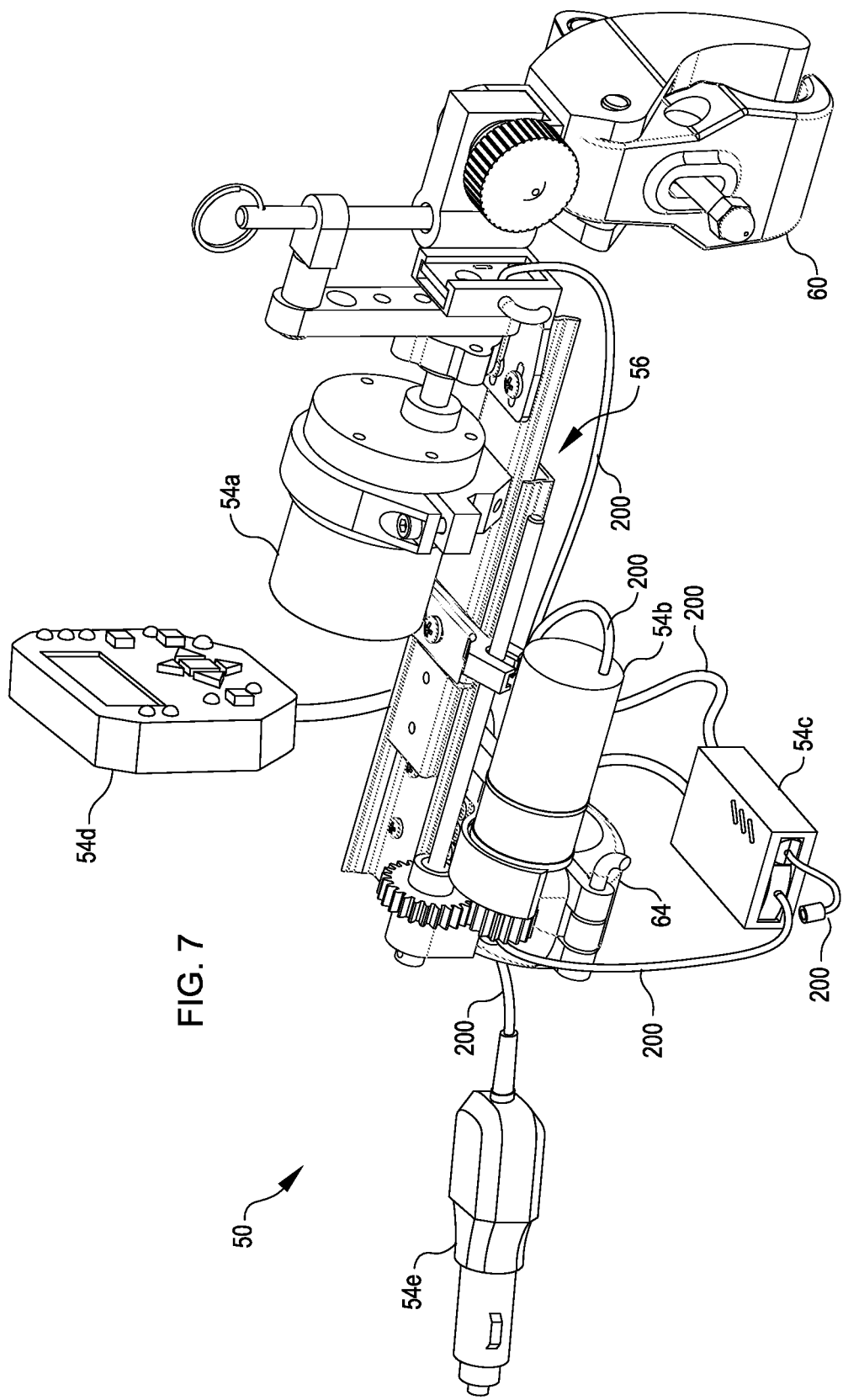

FIG. 7 shows a perspective view of the autopilot system shown in FIG. 1, according to an embodiment of the invention.

Figure 8:
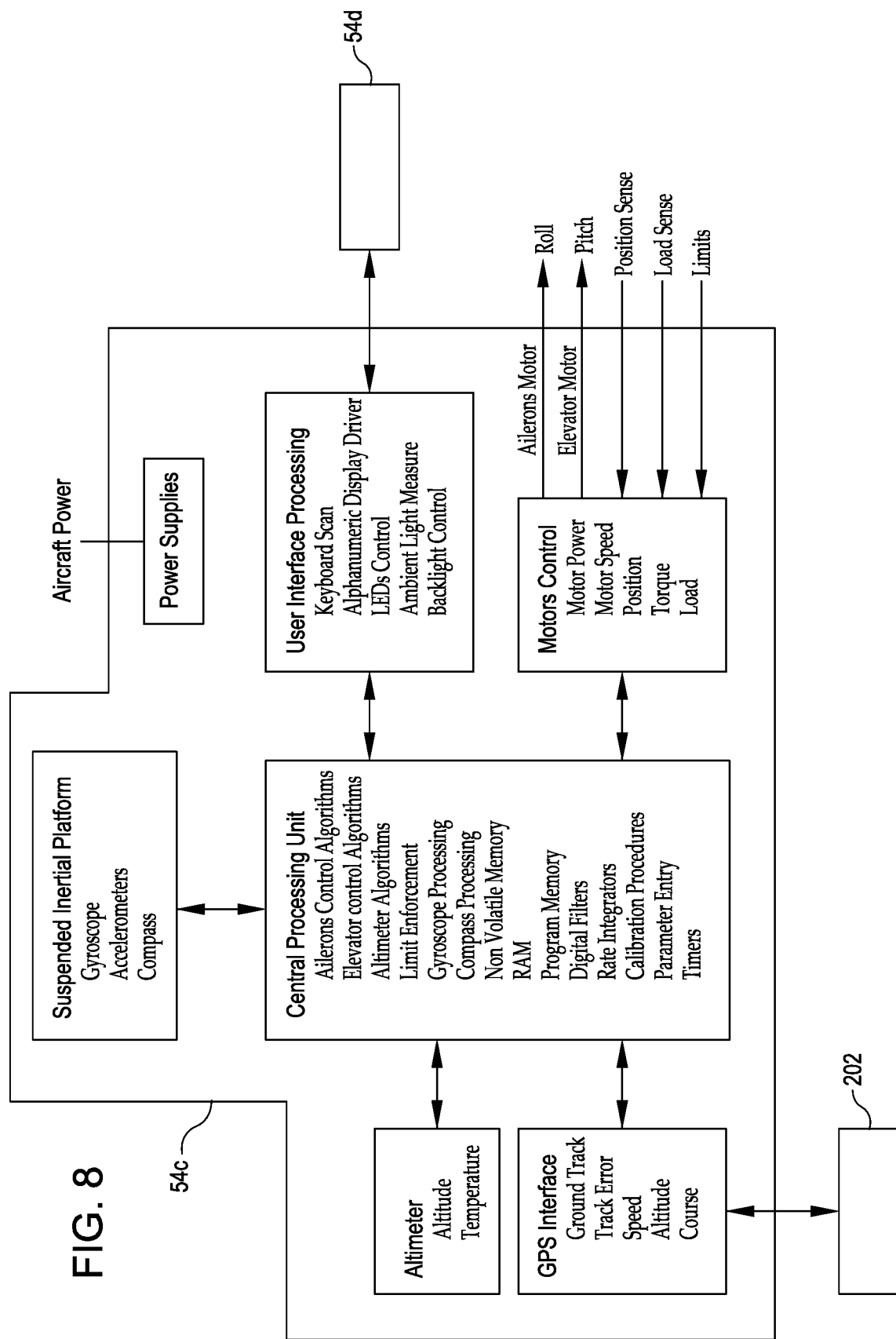

FIG. 8 shows a schematic view of the autopilot system in FIG. 7, according to an embodiment of the invention.

Figure 9:
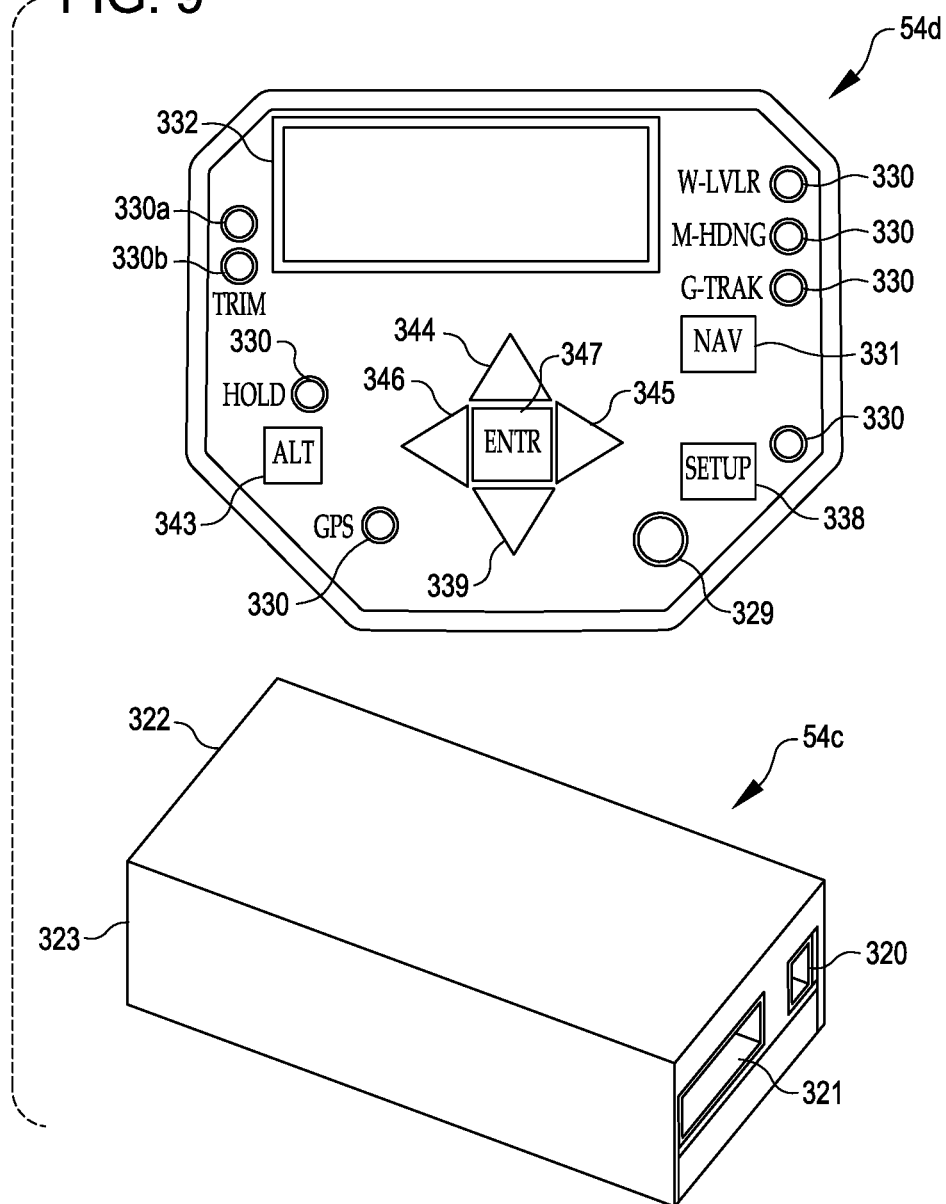

FIG. 9 shows a plan view of a component the autopilot system in FIG. 7, according to an embodiment of the invention, and a perspective view of another component of the autopilot system in FIG. 7, also according to an embodiment of the invention.

Figure 10:
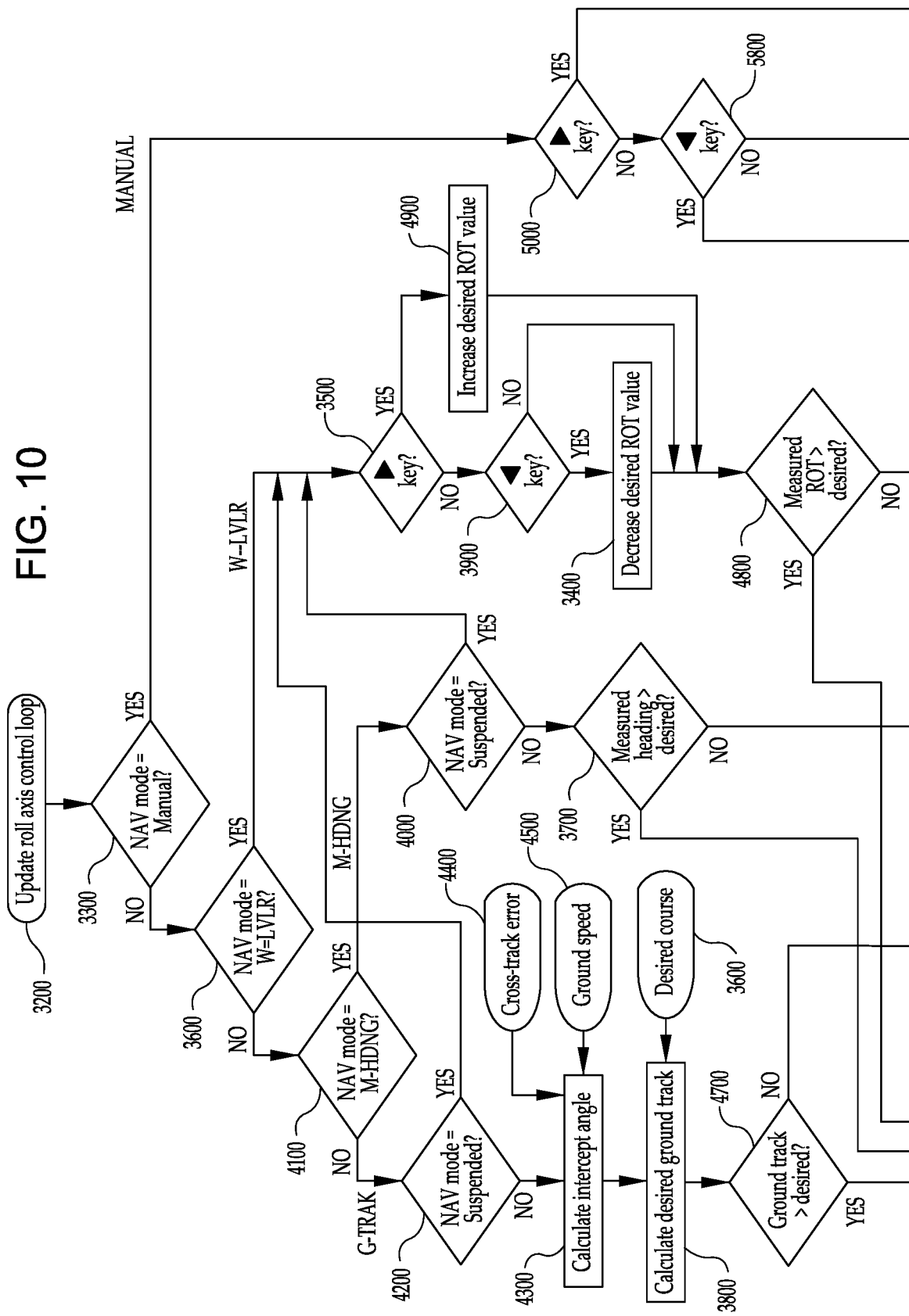

FIG. 10 shows a flowchart of a process that the autopilot system shown in FIG. 7 follows to control an aircraft's roll, according to an embodiment of the invention.

Each of FIGS. 11-14 shows a schematic view of a portion of the autopilot system shown in FIG. 7 that corresponds to one of four operational modes for controlling an aircraft's roll, each according to an embodiment of the invention.

Figure 15:
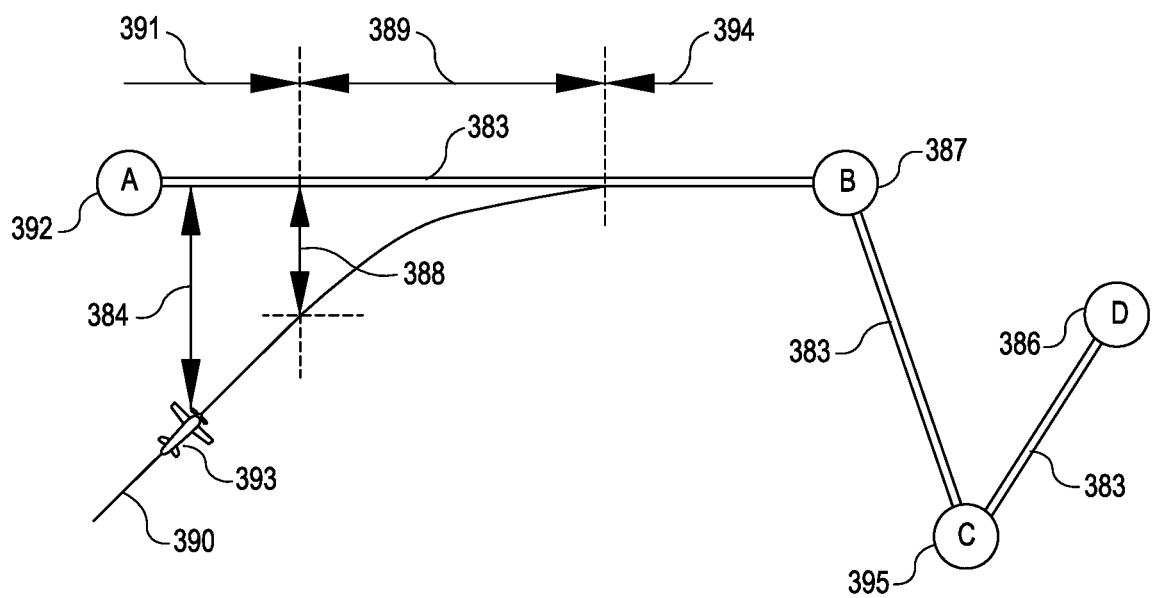

FIG. 15 shows an example of a flight plan that the autopilot system shown in FIG. 7 follows to navigate an aircraft, according to an embodiment of the invention.

Figure 16:
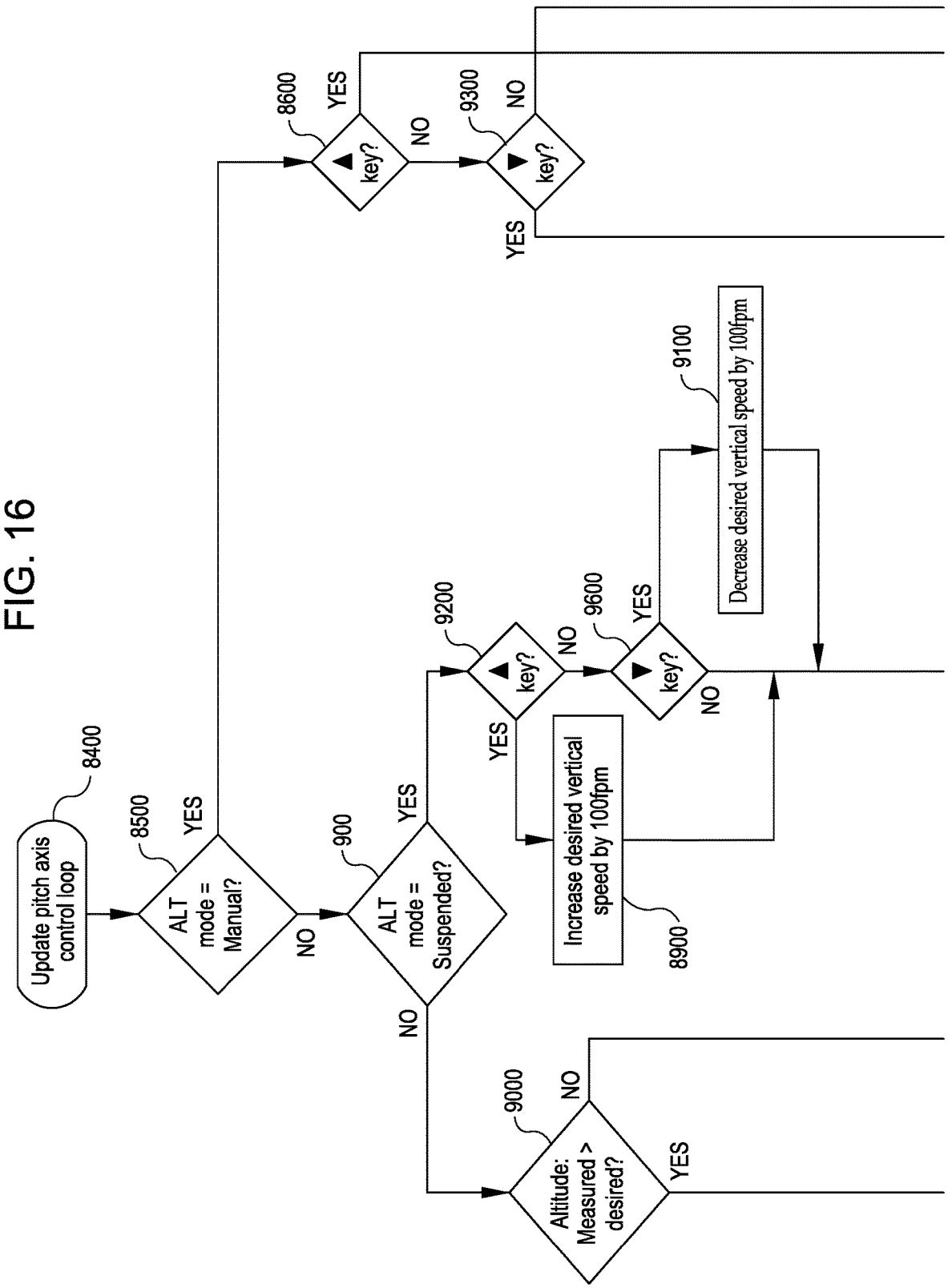

FIG. 16 shows a flowchart of a process that the autopilot system shown in FIG. 7 follows to control an aircraft's pitch, according to an embodiment of the invention.

Figure 17:
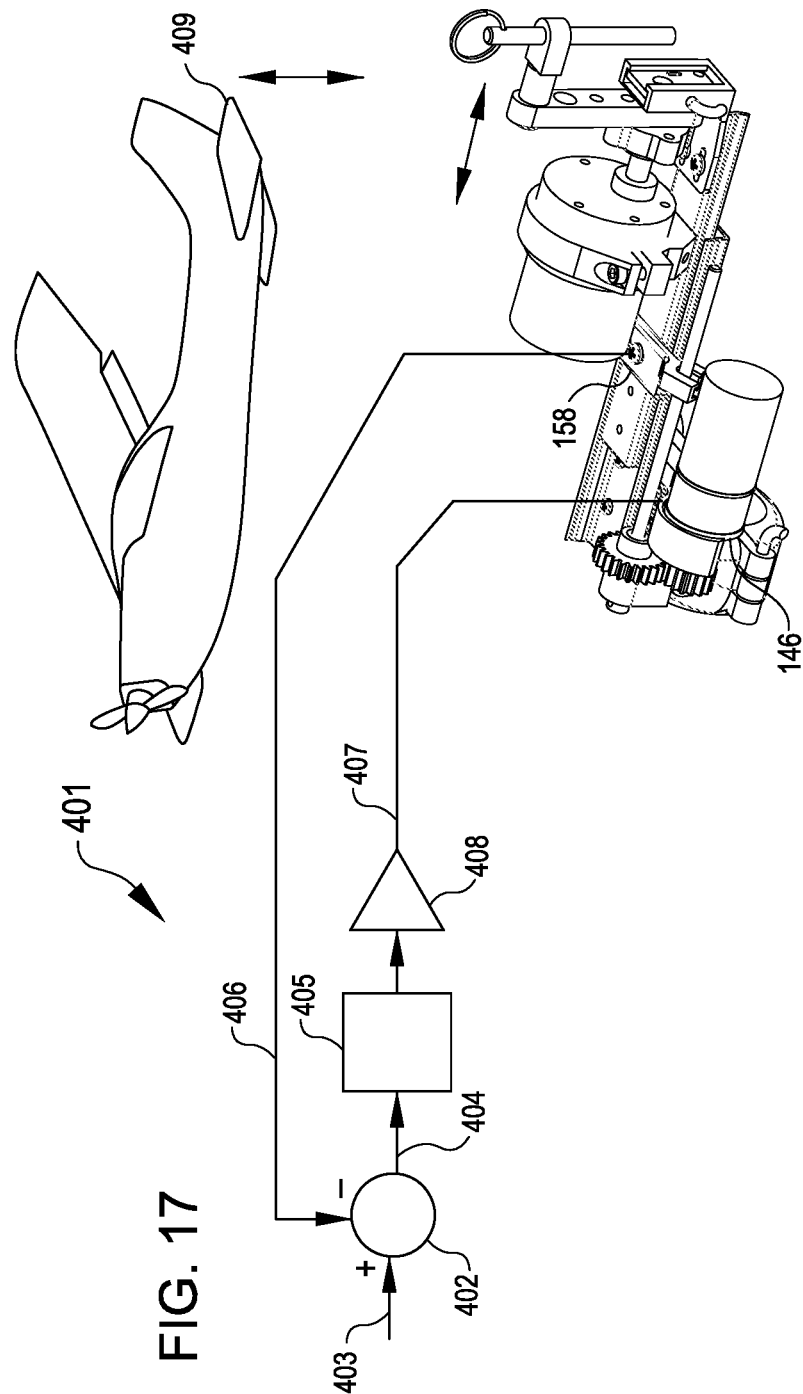
Figure 18:
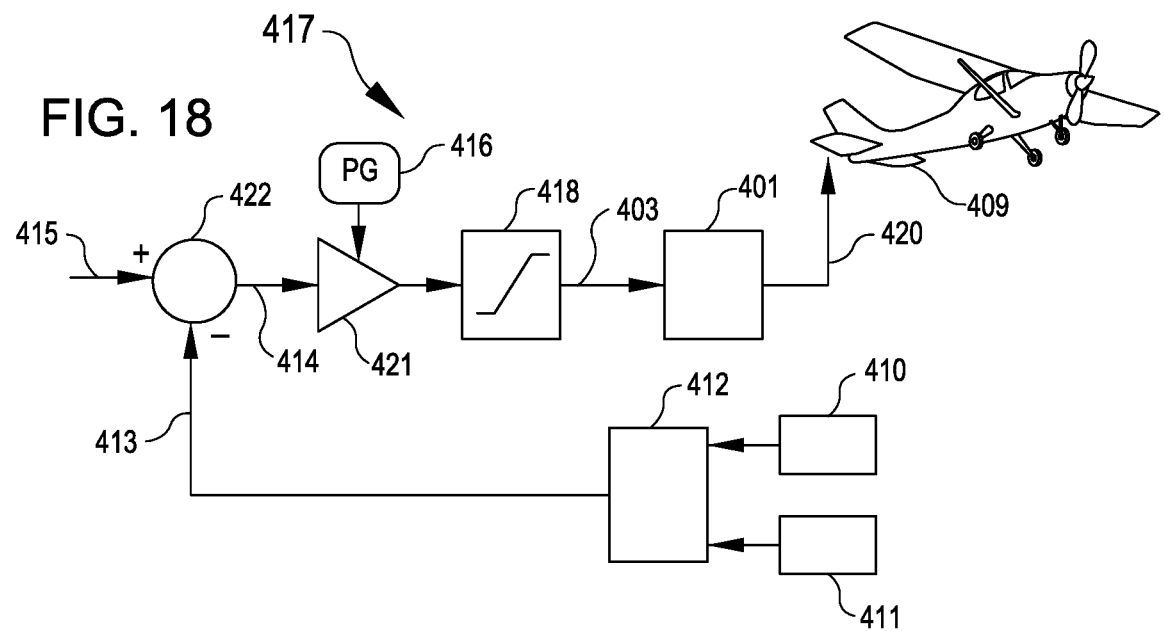
Figure 19:
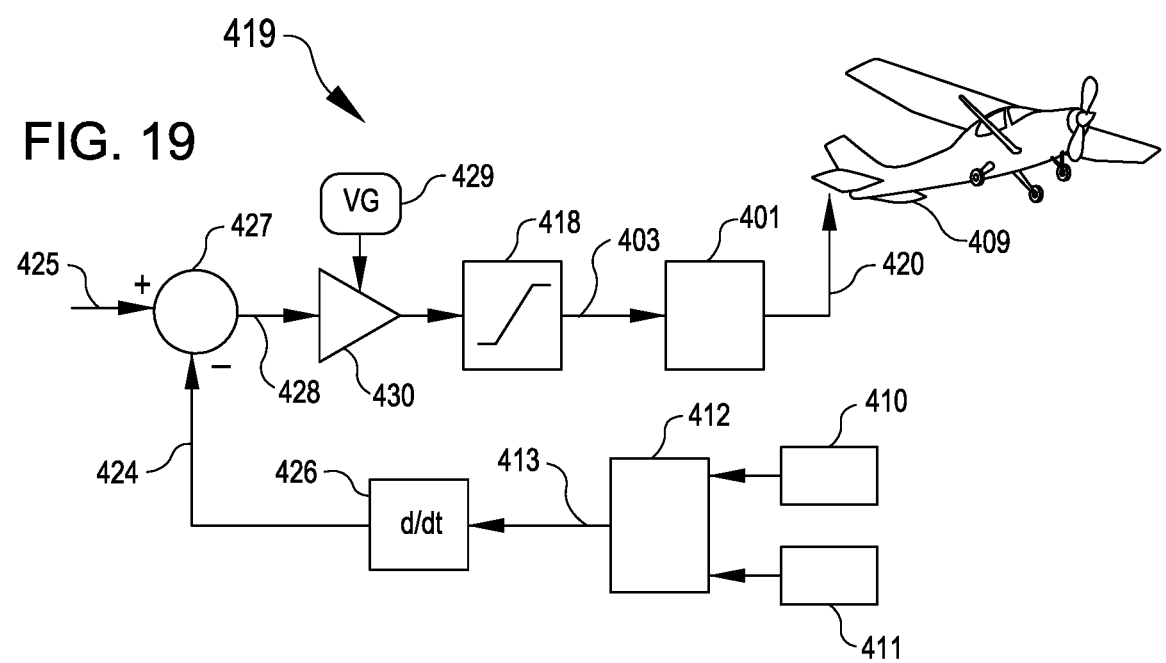
Figure 21A:
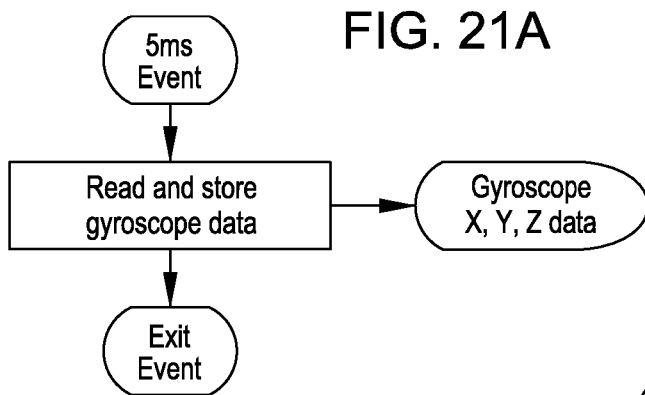
Figure 21B:
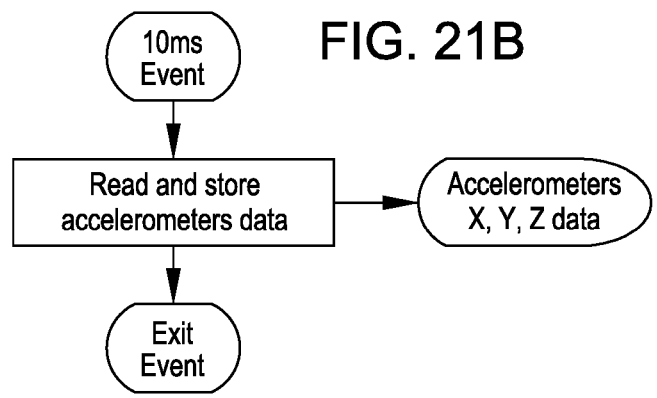
Figure 21C:
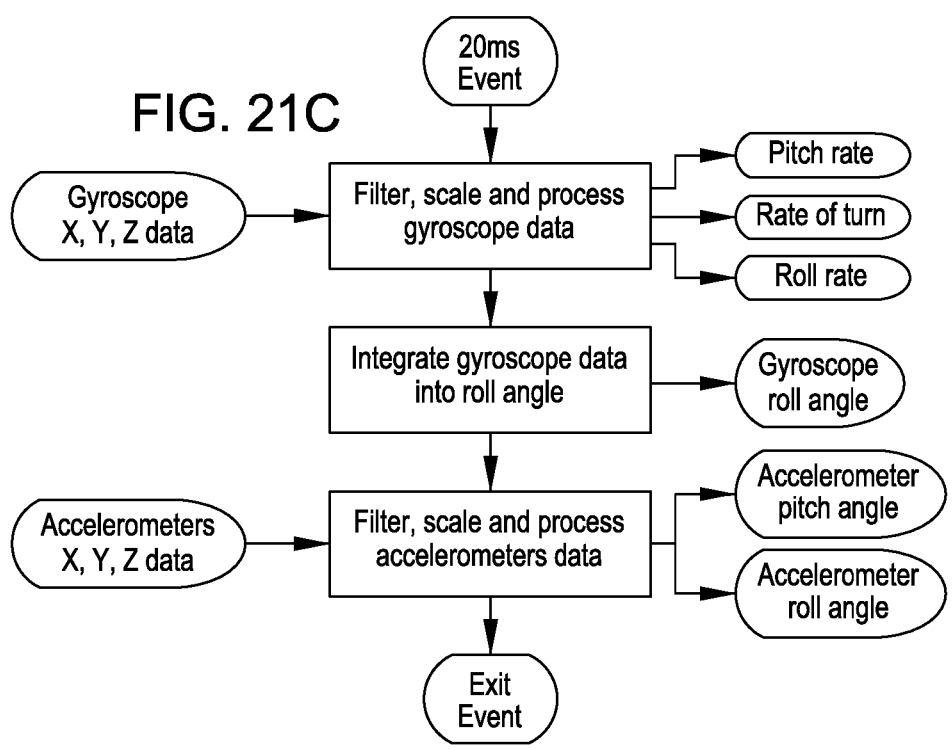
Figure 22A:
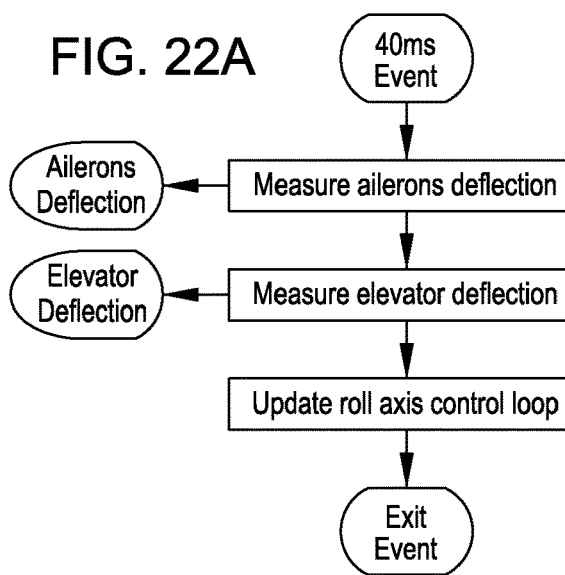
Figure 22B:
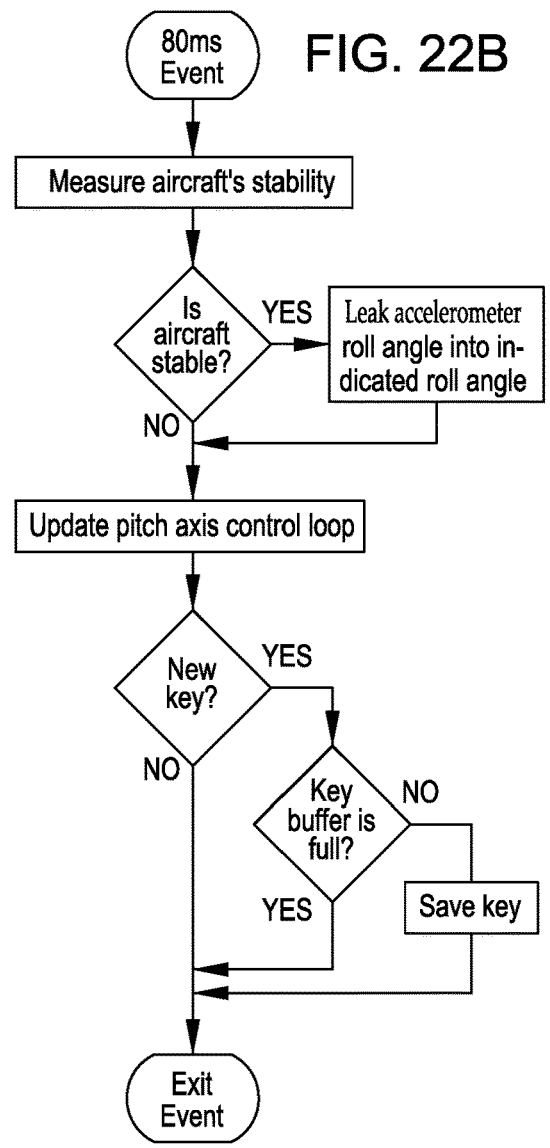
Figure 23A:
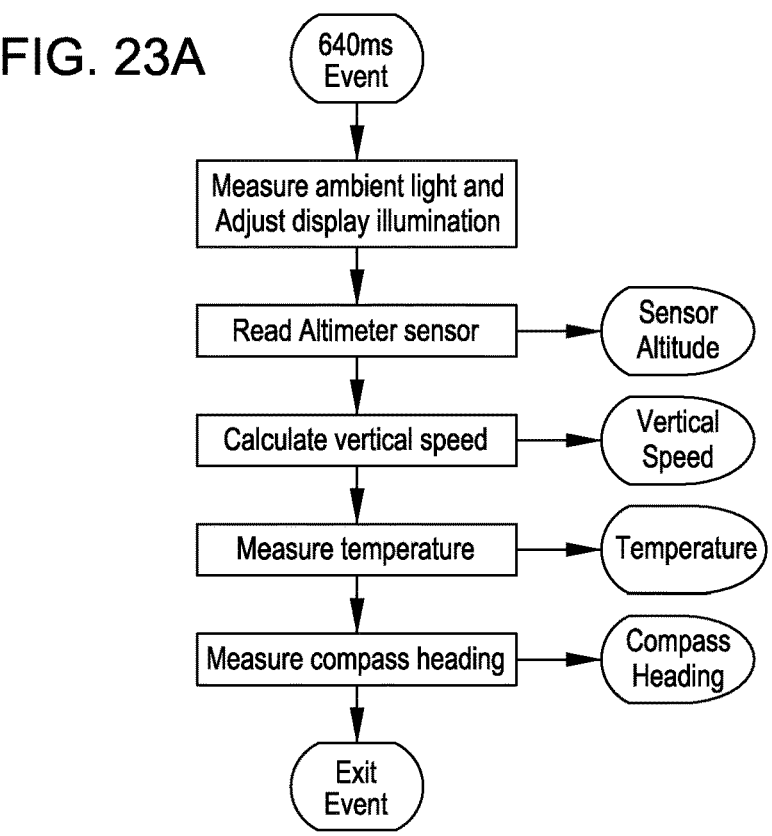
Figure 23B:
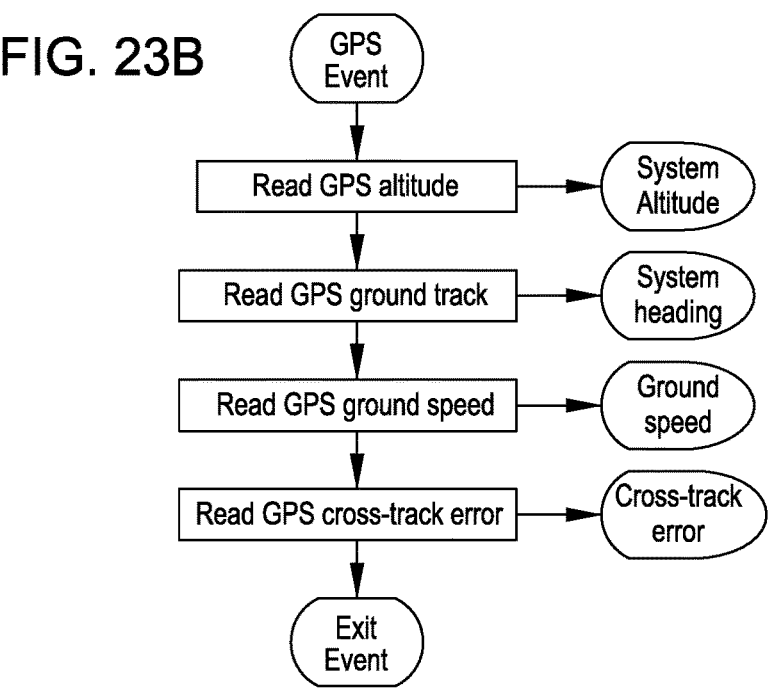

Each of FIGS. 17-19 shows a schematic view of a portion of the autopilot system shown in FIG. 7 that corresponds to one of three operational modes for controlling the aircraft's pitch, each according to an embodiment of the invention.

Each of FIGS. 20, 21A-21C, 22A, 22B, 23A and 23B shows a flowchart of a process that the autopilot system shown in FIGS. 1 and 7-19 follows, each according to an embodiment of the invention.

DETAILED DESCRIPTION

FIG. 1 shows a perspective view of an autopilot system 50, according to an embodiment of the invention. The autopilot system 50 is releasably mounted to a control yoke 52 in a cabin of an aircraft (here a Cessna 172). Although, the autopilot system 50 is shown releasably mounted to a control yoke 52, the autopilot system 50 may be releasably mounted to an aircraft's stick if the aircraft includes a stick in lieu of a control yoke 52. The autopilot system 50 includes an autopilot control circuit 54 to control an aspect of the aircraft's flight, and a device 56 to releasably mount the autopilot control circuit 54 to the aircraft's control yoke 52. As shown here in FIG. 1 and discussed in greater detail in conjunction with FIGS. 3 and 7-19, the autopilot system 50 includes two control circuits 54a and 54b; however, the autopilot system 50 may include fewer or more control circuits as desired. Control circuit 54a controls the aircraft's roll during flight by controlling the rotation of the yoke 52 in the directions indicated by the arrows 55a and 55b. Control circuit 54b controls the aircraft's pitch during flight by controlling the movement of the yoke 52 in the directions indicated by the arrows 55c and 55d. And, each of the control circuits 54a and 54b are governed by the autopilot system's control unit 54c and user interface unit 54d.

The device 56 includes a frame 58 that holds the control circuits 54a and 54b, a first coupler 60 to releasably mount the frame 58 to the aircraft's airframe 62 (here an instrument panel of the Cessna 172 which is fixed to the portion of the airframe that defines the aircraft's cabin), and a second coupler 64 to releasably mount the frame 58 to the control yoke 52. When the device 56 is releasably mounted to the aircraft's instrument panel 62 and control yoke 52, and when the autopilot control circuits 54a and 54b are engaged, each control circuit 54a and 54b receives a signal from the control unit 54c to either hold the device's frame 58 still to maintain the aircraft's current flight trajectory, or move the devices frame 58 to move the control yoke 52 to change the aircraft's current flight trajectory.

With the autopilot system 50, one may convert an aircraft that does not include an autopilot system into one that does, and use the autopilot system 50 to control one or more aspects of the aircraft's flight. This allows a pilot to enhance the safety of his/her flight by reducing his/her workload and fatigue, especially during longer flights, and improve flight time and fuel efficiency. The autopilot system 50 may also be used to keep an aircraft's wings level when the pilot needs both hands to look up reference information. This is particularly important while flying in unstable air, which requires the pilot to maintain an uninterrupted force on the aircraft's flight controls to maintain a heading. In addition, in aircraft that already have an autopilot system, the additional autopilot system 50 can provide a redundant autopilot system should the original autopilot system not work properly.

With the device 56 one can releasably mount one or more autopilot control circuits 54 to a control yoke and/or stick of a variety of different aircraft to quickly and easily control one or more aspects of the aircraft's flight. This allows a pilot to use the same autopilot system 50 in a variety of different aircraft. For example, a pilot may rent an aircraft that does not include an autopilot system, and safely fly the aircraft a long distance by releasably mounting the portable autopilot system 50 in the aircraft's cabin. Then, for the return trip, the pilot may rent a different aircraft that also does not include an autopilot system, and safely fly the aircraft by releasably mounting the same portable autopilot system 50 in the aircraft's cabin, enjoying the benefits stated above.

FIG. 2 shows a perspective view of the device 56 shown in FIG. 1, according to an embodiment of the invention. The device 56 includes a frame 58 for holding an autopilot control circuit. The device 56 also includes a first coupler 60 that is releasably fastened to the frame 58 and is operable to releasably mount the frame 58 to an aircraft's airframe. The first coupler 60 is discussed in greater detail in conjunction with FIGS. 3, 4A and 4B. The device 56 also includes a second coupler 64 that is also releasably fastened to the frame 58 and is operable to releasably mount the frame 58 to an aircraft's flight control component. In addition to the second coupler 64 being shown in FIG. 2 and discussed below, the second coupler 64 is shown in FIGS. 4C and 4D, which should also be referred during the discussion below.

The frame 58 may be configured as desired to hold an autopilot control circuit and move the second coupler 64, and thus an aircraft's flight control component (control yoke and/or stick), relative to the first coupler 60. For example, in this and other embodiments, the frame 58 includes a first portion 70 having an end 72 and a second portion 74 having an end 76. The first portion's end 72 is configured to releasably fasten to the first coupler 60 as shown in FIG. 3 and discussed in greater detail in conjunction with FIG. 3. The first portion 70 is configured to hold the second portion 74 such that the second portion 74 may slide in either of the directions indicated by the arrows 78a and 78b, but not move in the directions indicated by the arrow 80 relative to the first portion. The second portion's end 76 is configured to pivot in the directions indicated by the arrows 82a and 82b about the axis 84. In this configuration, when the second coupler 64 is releasably mounted to the yoke 52 (FIG. 1) and the second portion's end 76 pivots about the axis 84, the second coupler 64, and thus the yoke 52, rotate about the axis 86, or the axis of the shaft of the yoke. And, when the frame's second portion 74 slides relative to the frame's first portion 70, the second coupler 64, and thus the yoke 52, move along the axis 86 closer to or farther away from the first coupler 60.

The second coupler 64 may be releasably fastened to the frame 58 in any desired manner. For example, in this and other embodiments, the coupler 64 is pinned to the end 76 of the frame's second portion. More specifically, the device 56 includes a pin 88 that a receptacle 90 of the second coupler 64 receives and that a collar 92 of the end of the frame's second portion surrounds. The receptacle 90 and collar 92 are sized to fit around the pin 88 such that the pin 88 does not wobble inside each of them, but slides along the axis 94 relative to each. Configured in this manner, the collar 92 slides relative to the pin 88 along the axis 94 as the end 76 pivots about the axis 84, so that the second coupler 64 may freely rotate about the axis 86 in response. If the collar 92 didn't slide relative to the pin 88, then the rotation of the end 76 would try to move the second coupler across the axis 86 in addition to rotating it about the axis 86, and thus bind up the motion of the second coupler 64.

Another benefit of this configuration is that one may quickly and easily releasably fasten the frame 58 to the second coupler 64 after the coupler 64 is mounted to the yoke 52 by aligning the collar 92 with the receptacle 90 and then inserting the pin 88 through the collar 92 and into the receptacle 90. Or, one may releasably fasten the frame 58 to the second coupler 64 before releasably mounting the second coupler 64 to the yoke 52. In either case, after the device 56 has been releasably mounted to the yoke 52, one can quickly and easily release the second coupler 64, and thus the yoke 52, from the frame 58 by withdrawing the pin 88 from the receptacle 90. This allows one to quickly disengage the autopilot system 50 (FIG. 1) from the aircraft to take control of the aircraft's flight trajectory. In addition, the pin 88 includes a breakaway portion 96 (shown in FIG. 4D) that is sized to break in shear when a predetermined shear load is applied to the pin 88 to provide the pilot another mechanism for disengaging the autopilot system 50. With the pin's breakaway portion 96, one may simply grab the yoke 52 and push/pull and/or rotate the yoke 52 with enough force to cause the breakaway portion 96 to break, and thus release the second coupler 64 from the frame 58.

Still referring to FIG. 2, the second coupler 64 may be configured as desired to releasably mount the frame 58 to the aircraft's flight control component. For example, in this and other embodiments, the coupler 64 includes a clamp 98 having two jaws 100a and 100b. The jaw 100a is pivotally attached to the jaw 100b, so that one may spread apart the jaws 100a and 100b to insert the shaft of the yoke 52 or stick. A bolt 102 is slidably attached to the jaw 110b and threadingly attached to the jaw 100a. To releasably mount the second coupler 64 to the shaft of the yoke 52, the bolt 102 is moved relative to the jaw 100b by rotating the cam 106 (FIG. 4C). This urges the jaw 100a toward the jaw 100b and generates a squeezing force on the shaft. To allow the clamp 98 to hold a variety of different shafts each having a different shaft diameter, the bolt 102 may be threadingly moved relative to the jaw 100a to move the cam 106 toward or away from the jaw 100a, before rotating the cam 106 to force the jaw 100a toward the jaw 100b. The jaw 100b also includes a clevis 108 through which a pin 110 passes to pivotally connect the clamp 98 to the body 109 that houses the receptacle 90. Pivotally connected in this manner, the clamp 98 may be clocked (such as 90 degrees) relative to the clamp's position shown in FIG. 2 to releasably mount the second coupler 64 to a stick whose shaft is more vertical than the shaft of the yoke 52 (FIG. 1). To lock the clamp 98 in a desired position, one rotates the knob 112 (FIG. 4C) to generate friction between the clevis 108 and the body 109.

FIG. 3 shows a perspective view of the device 56 shown in FIGS. 1 and 2, according to an embodiment of the invention. The device 56 includes a first coupler 60 that is releasably fastened to the frame 58 and is operable to releasably mount the frame 58 to an aircraft's airframe. In addition to the first coupler 60 being shown in FIG. 3 and discussed below, the first coupler 60 is shown in FIGS. 4A and 4B, which should also be referred to during the discussion below. As shown in FIG. 3, the device's frame 58 holds the autopilot control circuit 54a that controls an aircraft's roll, and the autopilot control circuit 54b that controls the aircraft's pitch.

The first coupler 60 may be releasably fastened to the frame 58 in any desired manner. For example, in this and other embodiments, the first coupler 60 includes a receptacle 116 configured to hold the end 72 of the frame's first portion 70, and a depression 117 configured to hold a ball 118 located in the end 72. More specifically, the first coupler 60 includes two depressions located in the receptacle 116, and the end 72 of the frame's first portion 70 includes two balls 118. When the end 72 of the frame's first portion 70 is releasably fastened to the first coupler 60, the body 120 lies in the receptacle 116, the lip 122 lies in the groove 124, and each of the balls 118 extend into a respective one of the depressions 117. A spring disposed inside the body 120 urges each of the balls 118 into their respective depression 117. To release the frame's first portion 70, and thus the frame 58 from the first coupler 60, one may pull the end 72 of the frame's first portion 70 up away from the first coupler 60.

The first coupler 60 may be configured as desired to releasably mount the frame 58 to the aircraft's airframe. For example, in this and other embodiments the first coupler 60 includes a clamp having a first half 126 and a second half 128. The first and second halves 126 and 128 are sized and configured to hold a specific portion of a specific aircraft's airframe. For example, the first and second halves 126 and 128, are sized and configured to clamp onto a portion of the instrument panel of a Cessna 172. To allow the device 56 to be releasably mounted to other aircraft models or other locations in a Cessna 172, a first coupler that is similar to but different than the first coupler 60 may be releasably fastened to the frame 58. The first half 126 includes the receptacle 116, and a plug 130 and contacts 132 (seven shown but only one labeled for clarity) to couple the control circuits 54a and 54b to the autopilot system's control unit 54c (FIG. 1). The first half 126 and the second half 128 each includes a boss 134 that prevents the first coupler 60, and thus the frame 58 from moving relative to the aircraft's airframe. In this manner, the autopilot control circuits 54a and 54b may move the end 76 without moving the first coupler 60 or the frame 58 in the opposite direction. Two pins 136a and 136b inserted through knuckles 138a and 138b in each of the halves 126 and 128 fasten the first half 126 to the second half 128.

Still referring to FIG. 3, the autopilot control circuit 54a may be configured as desired. For example, in this and other embodiments, the autopilot control circuit 54a includes an electric motor 140 mounted to the frame's second portion 74. The motor's output shaft 142 is coupled to the end 76 such that rotating the output shaft 142 causes the end 76 to pivot about the axis 84 (FIG. 2). The motor 140 receives signals from the autopilot system's control unit 54c that direct the motor to rotate its output shaft 142. The autopilot control circuit 54a also includes an aileron position and force sensor 144 that tells the control unit 54c the position of the ailerons based on the position of the yoke 52, and the amount force required on the yoke 52 to hold the ailerons at the position. Knowing this information before one disengages the autopilot control circuit 54a helps one avoid sudden changes in the aircraft's flight trajectory as one takes over control of the aircraft. The autopilot control 54a is discussed in greater detail in conjunction with FIGS. 7-15.

The autopilot control circuit 54b may also be configured as desired. For example, in this and other embodiments, the autopilot control circuit 54b includes a motor 146 coupled to a lead screw 148 via a gear 150. The autopilot control circuit 54b also includes a carrier 152 operatively coupled to the lead screw 148 such that as the lead screw 148 rotates, it moves the carrier 152 in one of the two directions indicated by the arrows 154a and 154b. The carrier 152 is mounted to the second portion 74 of the frame 58, and the motor 146 and lead screw 148 are mounted to the first portion 70 of the frame 58. Thus, when the lead screw 148 rotates clockwise, the carrier 152 moves in the direction indicated by the arrow 154b, which moves the frame's second portion 74 in the same direction. This in turn moves the second coupler 64, and thus the yoke 52, towards the first coupler 60. Similarly, when the lead screw 148 rotates counterclockwise, the carrier 152 moves in the direction indicated by the arrow 154a, which moves the second portion 74 in the same direction. This in turn moves the second coupler 64, and thus the yoke 52, away from the first coupler 60. To rotate the lead screw 148, the motor 146 rotates its output shaft 156, which rotates the gear 150. The autopilot control circuit 54b also includes an elevator position and force sensor 158 that tells the control unit 54c the position of the aircraft's elevator based on the position of the yoke 52, and the amount force required on the yoke 52 to hold the elevators at the position. Knowing this information before one disengages the autopilot control circuit 54b helps one avoid sudden changes in the aircraft's flight trajectory as one takes over control of the aircraft.

FIGS. 5 and 6, together show a perspective view of a portion of a device 160 of an autopilot system, according to another embodiment of the invention. The device 160 is similar to the device 56 shown and discussed in conjunction with FIGS. 1-4D, except that the second coupler 162 is releasably fastened to the end 164 of a second portion 166 of a frame 168 via a pin 170 that may slide in a slot 172 of a yoke 174. In this configuration, the pin's longitudinal axis 176 is substantially perpendicular to the slot 172. In this manner, the second coupler may be releasably fastened to the frame 168 quickly and easily, and unlike the device 56, one does not have to align a collar 92 (FIG. 2) with a receptacle 90 (FIG. 2) before inserting a pin 88 (FIG. 2).

FIG. 7 shows a perspective view of the autopilot system 50 shown in FIG. 1, according to an embodiment of the invention. FIG. 8 shows a schematic view of a portion of the autopilot system 50 in FIG. 7, according to an embodiment of the invention. The autopilot system 50 includes control circuits 54a and 54b, a control unit 54c, a user interface 54d, and a power coupler 54e that may be inserted into a cigarette lighter and convey power to the control circuits 54a and 54b, the control unit 54c, and the user interface 54d. Control circuit 54a controls the aircraft's roll during flight and is discussed in greater detail in conjunction with FIGS. 10-15. Control circuit 54b controls the aircraft's pitch during flight and is discussed in greater detail in conjunction with FIGS. 16-19. The control unit 54c governs the control circuits 54a and 54b, and is discussed in greater detail in conjunction with FIGS. 9-19. The user interface 54d allows one to input information into the autopilot system 50 and displays information from the autopilot system 50. The user interface 54d is discussed in greater detail in conjunction with FIGS. 9-19. The autopilot system 50 also includes cables 200 for transmitting signals and/or power to components of the autopilot system 50. In addition, the autopilot system 50 may be coupled to a global positioning system (GPS) 202 (not shown in FIG. 7 but shown in FIG. 8) and receive and use information from the GPS to help control the aircraft's flight trajectory.

FIG. 9 shows a plan view of the user interface 54d, according to an embodiment of the invention, and a perspective view the control unit 54c, also according to an embodiment of the invention.

The user interface 54d may be configured as desired to allow one to provide the control unit 54c information and to receive and display information from the control unit 54c. For example, in this and other embodiments, the user interface 54d includes an alphanumeric display 332, enunciator lights 330, keys, and ambient light sensor 329. The control unit 54c scans for a key entry, measures an ambient light signal from the sensor 329, and sets light intensity of the enunciators 330 and display 332 for optimal visibility under the current lighting condition. The alphanumeric display 332 displays relevant parameters and messages to the pilot which are applicable to the current operation of the autopilot system 50. The enunciators 330 include LEDs, and provide status and mode information. In addition to displaying the relevant parameters for the current operation of the autopilot system 50, the user interface 54d may display two critical flight performance parameters—ground speed and altitude of the aircraft. To do this, a GPS unit 202 (FIG. 8) is connected to the control unit 54c. By displaying these two flight parameters, the autopilot system 50 provides an important safety backup in case of failure of the aircraft's respective instruments.

Still referring to FIG. 9, the control unit 54c may be configured as desired to govern the control circuits 54a and 54b. For example, in this and other embodiments, the control unit 54c includes electronics necessary to measure flight and environmental parameters, power the motors 140 (FIG. 3) and 146 (FIG. 3), decipher GPS data, send display data to the user interface 54d, and receive key actuations from the user interface 54d as well as measure ambient light and set display backlight intensity. In addition, the control unit 54c may measure the torque and position of one or more of the motors 140 and 146. The control unit 54c also provides memory and computing power to execute one or more algorithms that control the autopilot system's performance. Such algorithms include algorithms for controlling roll and pitch of the aircraft during flight, performing self diagnostics, and performing the logic required for the various modes of operation and exception analysis and handling. The control unit 54c includes an inertial measurement unit, which is suspended to isolate it from mechanical vibrations. The inertial measurement unit includes miniature gyroscopes, accelerometers, magnetic compass sensors, and an altimeter sensor. The control unit 54c also includes four connectors: 1) a power connector 320 to receive the power coupler 54e (FIG. 7) and provide aircraft power to the autopilot system 50, 2) a user interface connector 321 to provide power and communication to the user interface 54d, 3) an actuation apparatus connector 323 to provide power and communication to the motors 140 and 146, and 4) an external GPS connector 322 to provide power and communication to an optional GPS unit 202 (FIG. 8).

The control unit 54c may be mounted anywhere as desired. For example, in this and other embodiments, the control unit 54c is mounted to the bottom of the device 56 (FIGS. 2 and 3). In other embodiments, the control unit 54c may be mounted to another location which is referenced to the airframe. Because the control unit 54c uses an inertial measurement unit to orient the aircraft in space, the control unit 54c should be positioned at a stable location in relation to the airframe.

FIG. 10 shows a flowchart of the control unit's process for operating the control circuit 54a, according to an embodiment of the invention. Each of FIGS. 11-14 shows a schematic view of a portion of the control circuit 54a that corresponds to one of four operational modes, each according to an embodiment of the invention. And FIG. 15 shows an example of a flight plan that the autopilot system 50 uses the control circuit 54a to follow (or navigate), according to an embodiment of the invention.

The control unit 54c monitors the user interface 54d for information that changes the input parameters of the control circuit 54a, such as a change in operational modes; or a change in a parameter within the operational mode currently in use, such as a change in a desired aileron deflection or desired rate of turn (ROT) typically expressed in degrees per second (dps). The control unit 54c then invokes the appropriate algorithm to effect the desired control of the aircraft.

The control circuit 54a includes a servo circuit 356 (FIG. 11) that applies force to the yoke 52, and includes the motor 140 (FIG. 3). The control circuit 54a also includes four selectable operational (or NAV) modes: 1) Manual mode; 2) Wing Leveler (W-LVLR) mode; 3) Heading Hold (M-HDNG) mode; and 4) GPS Tracking (G-TRAK) mode. To select one of the four modes, one simply pushes the NAV key 331 of the user interface 54d until one of the lights 330 corresponding to the desired mode is on. When none of the lights 330 is on, then this indicates that the Manual mode is in operation. Each of the operation modes includes an algorithm that determines when and to what extent the aircraft's ailerons should be moved to provide a desired flight trajectory. After this has been determined, the control unit 54c uses the servo circuit 356 to power the motor 140 to effect the change in the position of the aircraft's ailerons. The Manual operational mode is discussed in greater detail in conjunction with FIG. 11. The Wing Leveler (W-LVLR) operational mode is discussed in greater detail in conjunction with FIG. 12. The Heading Hold (M-HDNG) operational mode is discussed in greater detail in conjunction with FIG. 13. And the GPS Tracking (G-TRAK) operational mode is discussed in greater detail in conjunction with FIG. 14.

Referring to FIG. 10, the flowchart shows a roll axis control loop that the control unit 54c executes as frequently as desired. For example, in this and other embodiments, the control unit 54c executes the loop every 40 milliseconds to determine whether or not the deflection of the aircraft's ailerons should be changed. On entry of the Update roll axis control loop 3200, a selection tree made up of three tests 3300, 3600 and 4100, determines the roll axis or NAV mode. If it is in Manual mode, then the right key 345 (FIG. 9) and left key 346 (FIG. 9) of the user interface 54d increase 5200 or decrease 5100 the ailerons' desired deflection amount respectively. Here, increasing the ailerons' deflection means that the right aileron pivots upward relative to the wing while the left aileron pivots downward relative to the wing; and decreasing the ailerons' deflection means that the right aileron pivots downward while the left aileron pivots upward. If no key entry, then no adjustment is made to the aileron's deflection. Next, the deflection amount is converted and applied to the servo circuit 356 (Discussed in greater detail in conjunction with FIG. 11), which uses the Roll gain 1250 adhering to a set of limits 1240. If the selection tree indicates that the Wing Leveler (W-LVLR) mode is currently selected, then the control unit 54c checks for input via the keys of the user interface 54d. The Right key 345 (FIG. 9) increases 4900 the desired ROT, and the Left key 346 (FIG. 9) decreases 3400 the desired ROT value. Here, increasing ROT while turning to the right makes the plane turn steeper to the right, and decreasing ROT while turning to the right makes the plane turn shallower to the right. But, increasing the ROT while turning to the left makes the plane turn shallower to the left, and decreasing the ROT while turning to the left makes the plane turn steeper to the left. If the measured ROT value is greater than the desired ROT value 4800, then the aileron's desired deflection is decreased 5100, otherwise it is increased. The new desired deflection is then converted and applied to the servo circuit 356 to change the aileron's deflection, which again uses the Roll gain 1250 adhering to a set of limits 1240. If the selection tree indicates that the Heading Hold mode (M-HDNG) is currently selected, then the control unit 54c checks first to see if the mode is suspended 4000 (suspended is a secondary mode which is manifested as W-LVLR mode). If it is suspended then the Wing Leveler (W-LVLR) mode is invoked. If not suspended, then the measured heading (from the GPS or compass sensor) is compared to the desired heading 3700. If the measured heading is right of the desired heading then the control unit decreases ailerons' desired deflection amount 5100 to turn the aircraft to the left, else it turns it to the right by increasing the ailerons' desired deflection 5200. The new desired deflection is then converted and applied to the servo circuit 356 to change the aileron's deflection, which again uses the Roll gain 1250 adhering to a set of limits 1240, and the desired heading updated. If the selection tree indicates the GPS Tracking (G-TRAK) mode is selected, then the control unit 54c checks first to see if the mode is suspended 4200. If it is, then the Wing Leveler mode is invoked. If it isn't, then it calculates an appropriate intercept angle 4300 from the cross-track error 4400 and ground speed 4500 provided by the GPS. With this intercept angle and the desired course 3600 also provided by the GPS, it can calculate the desired ground track 3800 that the aircraft must fly in order to intercept or maintain the desired ground track corresponding to the GPS flight plan. The latter is equal to the desired course when the aircraft is on course (cross-track error=0 NM). Next, the aircraft's actual ground track is compared to the desired ground track 4700, and if the actual ground track, as provided by the GPS, is greater than the desired ground track, then it decreases the ailerons' desired deflection amount 5100 to turn the aircraft to the left to merge into the desired ground track. Else, it turns it to the right by increasing the ailerons' desired deflection 5200. The new desired deflection is then converted and applied to the servo circuit 356 to change the aileron's deflection, which again uses the Roll gain 1250 adhering to a set of limits 1240. Unless in Manual mode, all turn rates are proportional to the amount of error between the desired and actual headings or ROTs, and do not exceed 3.5 degrees per second (dps) to the left or the right. A smaller error results in a slower turn. Thus, the speed of the motor 140 while making corrections in heading is proportional to the amount of error in performing the comparisons of desired and measured ROT 4800, heading 3700 and ground track 4700.

Figure 11:
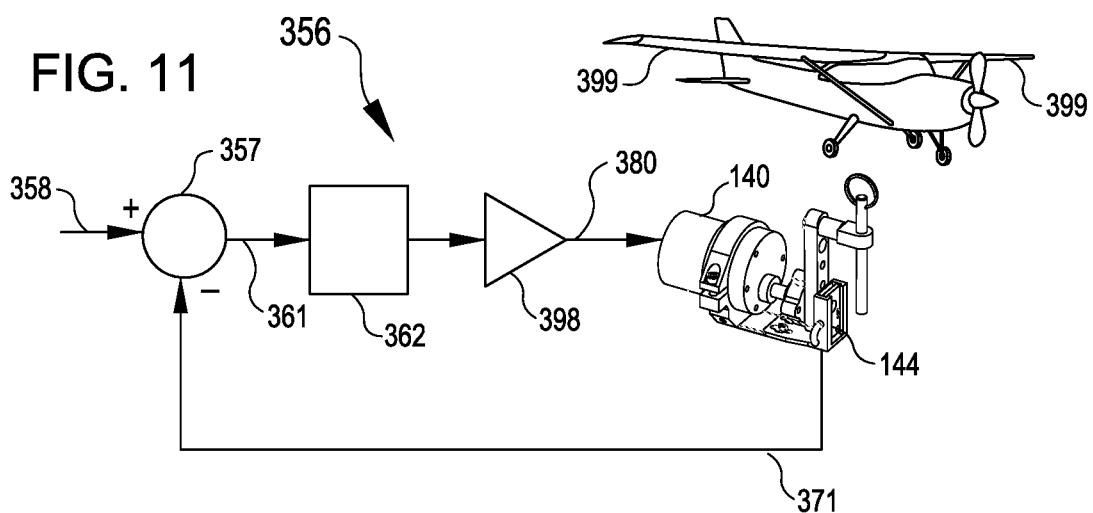

Referring to FIG. 11, the servo circuit 356 may be configured and invoked as desired. For example, in this and other embodiments, the servo circuit 356 is invoked when any of the four operational modes are selected and the control unit 54c determines that the aileron's deflection should be changed. When in the Manual operational mode this is done by pressing the Left key 346 or the Right key 345 of the user interface 54d. The input information is connected numerically to the input of the servo circuit 356, which directs the motor 140 to rotate the yoke 52 to effect the desired change in the aileron's deflection.

In this and other embodiments, the objective of the servo circuit 356 is to set the deflection of the aircraft's ailerons 399 to a pre-determined desired deflection amount 358. The input to this control loop is a numerical desired deflection amount 358 and the effect is an actual deflection of the aircraft's ailerons 399 to that amount. It is implemented in both algorithmic and electromechanical means, comprising a Roll servo difference function 357, a Roll motor drive algorithm 362, Roll motor drive electronics 398, and the motor 140. The difference between the numeric value of the desired deflection amount 358 and the ailerons' deflection as sensed by the ailerons' deflection sensor 144 corresponds to the ailerons' deflection error 361, which is converted to a proportional drive value by the Roll motor drive algorithm 362. The result of the algorithm is amplified by the Roll motor drive electronics 398, which output is interconnected to the motor 140, and powers the motor 140. As discussed in conjunction with FIGS. 2 and 3, the motor rotates the yoke 52 (FIG. 1), and the ailerons' deflection angle 371 is measured by the ailerons deflection sensor 144.

Figure 12:
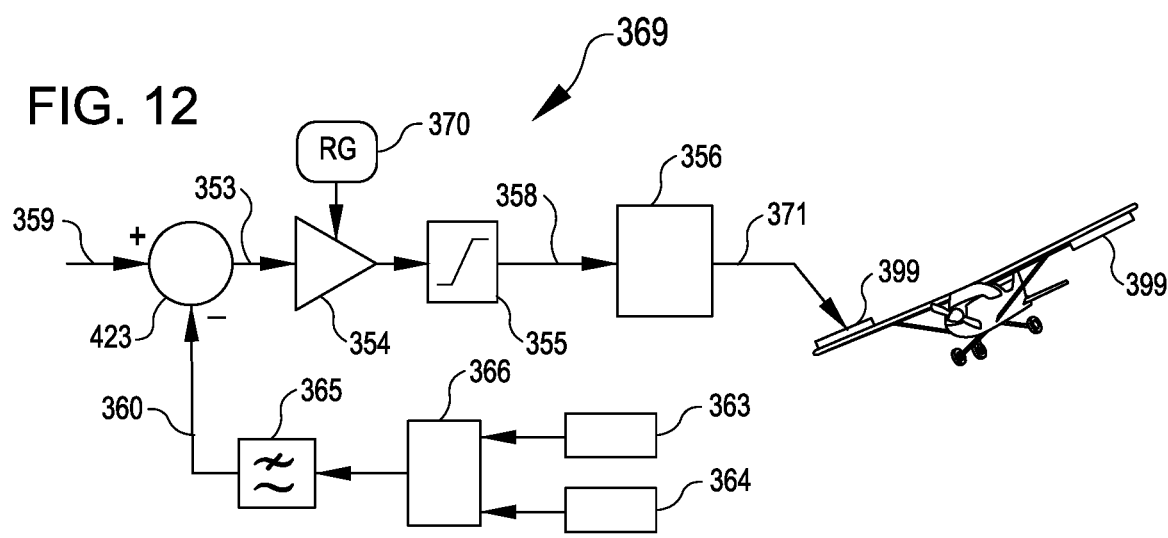

Referring to FIG. 12, the rate-of-turn (ROT) control loop 369 may be configured as desired. It may be invoked to turn the aircraft at a desired rate of turn, or it may be invoked to keep the aircraft's wings level (an ROT equal to zero) when the Wing Leveler (W-LVLR) operational mode is selected. One may enter a desired ROT value 359 by pressing the Left key 346 (FIG. 9) or the Right key 345 (FIG. 9) of the User interface unit 54d. This control loop 369 automatically sets the ailerons deflection angle 371 as necessary for turning the aircraft at the desired ROT value 359, or for maintaining level wings or zero ROT.

In this and other embodiments, the objective of this control loop 369 is to automatically set the deflection of the aircraft's ailerons to an amount which will result in an aircraft turning rate equal to the Desired ROT value 359 as set by the control unit 54c. The mechanism of this loop is implemented in both algorithmic and electrical circuitry means, comprising an ROT gyroscope 363, a GPS derived ROT 364, an ROT combiner 366, a Low pass digital filter 365, an ROT difference function 423, a Roll gain 370 factor, a Roll converter 354, a Roll axis limiter 355, and the servo circuit 356 (FIG. 11). To determine the present rate of turn (ROT) of the aircraft, the ROT combiner 366, algorithmically combines two ROT sources, the ROT gyroscope 363 data and the GPS derived ROT 364. The ROT is filtered using Low pass digital filter 365, and then subtracted from the desired ROT value by the ROT difference function 423. The result is a numeric ROT error 353 which is then scaled by a predetermined Roll gain 370, and converted by the Roll converter 354, to a proportional deflection value, which is then numerically limited by the Roll axis limiter 355 and fed as ailerons' desired deflection amount 358 to the Roll servo circuit 356. The servo circuit 356 then sets the ailerons deflection angle 371 to the desired deflection amount 358.

The limiter 355 imposes several predefined limits, which include ROT limit, roll rate limit, roll angle limit and ailerons deflection limit.

Note that setting a deflection is different than setting a rate. When entering an aileron deflection as in Manual mode, the aircraft may continue to roll, until such deflection is reversed or neutralized. When setting a rate of turn (ROT), however, the ailerons 399 are automatically and continuously adjusted by the autopilot system 50 resulting in a predictable turn rate.

Still referring to FIG. 12, in this and other embodiments, the default value of the Roll gain 370 is predetermined for each aircraft type and model, to provide optimal performance of the roll axis control system in terms of both, stability and responsiveness. This value is automatically loaded when selecting aircraft type and model, by using the setup facility provided in the autopilot system 50. This value may be edited by the pilot as to modify the roll axis performance as preferred by the pilot. This value is saved in non-volatile memory, and is reloaded anytime the autopilot system 50 powers up. Reducing the default Roll gain 370 results in a more sluggish aircraft response in turns, as well as lower tracking accuracy, while increasing it results in a quicker response, or jittery under-damped response or even hunting or oscillations in roll attitude.

Figure 13:
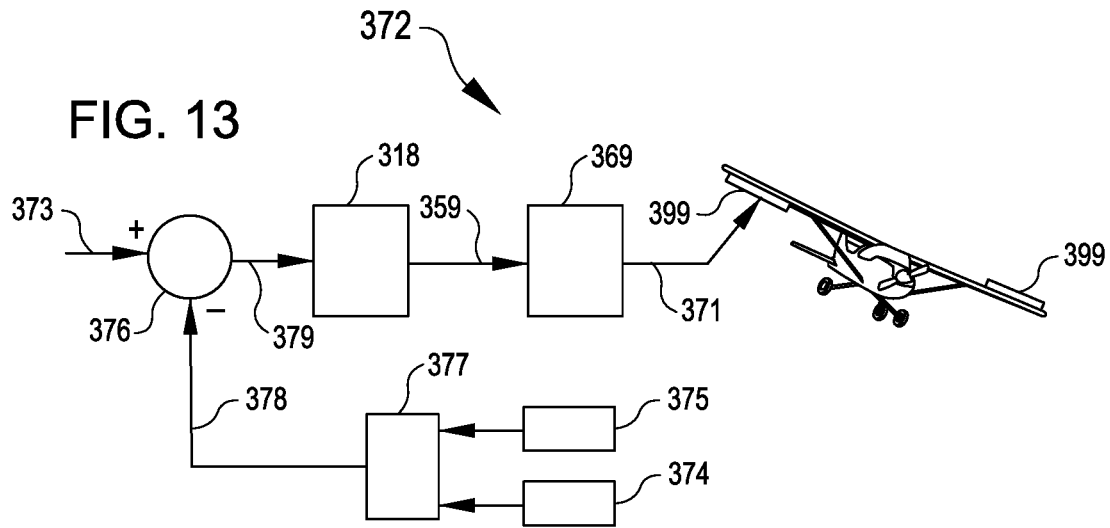

Referring to FIG. 13, the heading control loop 372 may be configured as desired to maintain a desired heading or ground track 373. Here, heading and ground-track are interchangeable. Typically, heading is used when referencing a magnetic compass, and ground-track is used when referencing GPS. The heading control loop 372 may be invoked by manually steering the aircraft to a desired heading, then selecting the Heading Hold mode. The heading control loop 372 may also be invoked while the system 50 is in the W-LVLR mode by pressing the NAV key 331 (FIG. 9) of the user interface 54d to enter the Heading Hold (M-HDNG) operational mode. At the instance the control loop 372 is invoked the current aircraft heading as indicated by the on-board compass sensor 375 and, if available, the current ground-track 374 from a GPS, is stored as desired heading 373. If, while in the Heading Hold (M-HDNG) mode, the aircraft is steered to a desired heading by pushing one or more of the right and left keys 345 and 346, respectively, then the Heading Hold (M-HDNG) mode is suspended. Suspended mode is similar to but not identical to W-LVLR mode. It is a W-LVLR mode with the capacity to set a turn rate value rather than keep the wings leveled. Once the right and/or left keys 345 and 346, respectively, are pushed while in the W-LVLR, M-HDNG or G-TRAK modes, the system 50 enters NAV suspended mode and the right and left keys 345 and 346, respectively, adjust a turn rate value. Suspended mode behaves the same in the W-LVLR, M-HDNG or G-TRAK modes. While suspended, the previously selected mode's LED flashes. When exiting the suspended mode the system 50 resumes the operating mode W-LVLR, M-HDNG or G-TRAK that it was suspended from. If the resumed mode is the W-LVLR mode, then the wings are leveled (ROT=0). If the resumed mode is the M-HDNG mode, then the current aircraft heading as indicated by the on-board compass sensor 375 and, if available, the current ground-track 374 from a GPS, is stored as desired heading 373. If the resumed mode is the G-TRAK mode, then the system 50 resumes tracking the flight plan—that is, re-intercepts and tracks the desired course in the plan.

In this and other embodiments, the objective of this control loop 372 is to automatically set the deflection of the Aircraft's ailerons 399 to an amount which will result in the aircraft flying a desired heading or ground track 373. This is done by automatically turning the aircraft at a desired ROT value 359 which will minimize any directional error. The mechanism of this loop 372 is implemented in both algorithmic and electrical circuitry means, comprising a heading measuring component, which includes a source selector 377, which automatically selects the current aircraft heading from an on-board compass sensor 375 or when available, the current ground-track 374 from a GPS. The measured heading or ground-track 378 is subtracted from the desired heading or ground track 373 using the difference function 376. This yields a numeric representation of the direction error 379. The error 379 is then scaled and converted by the ROT translator 318, to the desired ROT value 359, which is applied to the ROT control loop 369 (FIG. 12). The ROT control loop 369 automatically sets an ailerons deflection angle 371 to effect the required turn to return to or maintain the desired heading or ground-track 373, minimizing the amount of the direction error 379.

Still referring to FIG. 13, in this and other embodiments, when Heading Hold (M-HDNG) operational mode is selected while a GPS is unavailable, the source selector 377 will automatically select the compass sensor 375 for directional data. This will result in the nose of the aircraft pointing in the approximate direction of the desired heading or ground track 373, subjecting the actual flight path over the ground to wind drift error. An additional error in this case may be compass heading error, which could be several degrees. When GPS ground-track 374 is available, it will be automatically selected by the source selector 377, and the aircraft will fly a precise ground track which is negligibly affected by wind drift. In such a case, the aircraft will automatically point into the wind at an angle proportional to the wind speed and direction. The stronger the cross wind component, the more it will point towards the wind, resulting in negligible ground track error.

Figure 14:
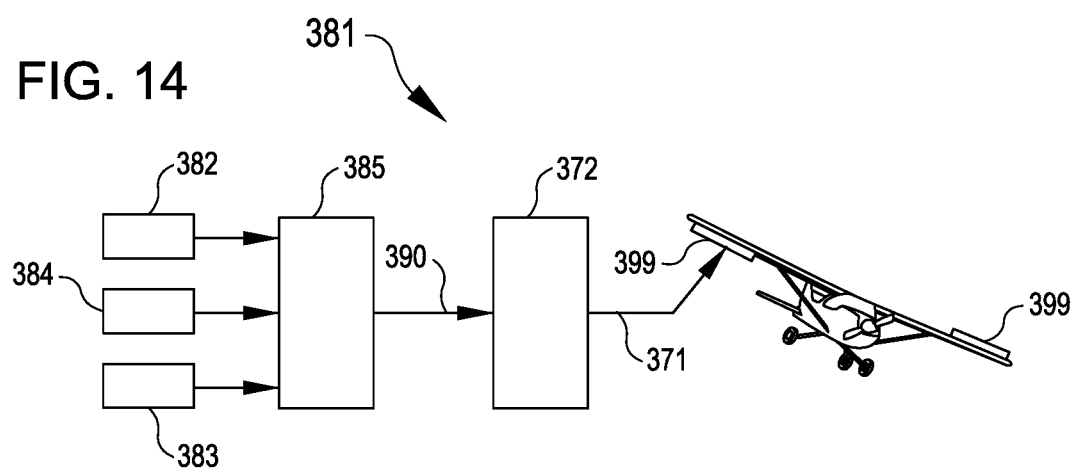

Referring to FIG. 14, the GPS tracking control loop 381 may be configured as desired to track a GPS flight plan or GoTo. It may be invoked when the GPS Tracking (G-TRAK) operational mode is selected. An active GPS flight plan, or route, may include several waypoints and segments, and each may have a different desired course 383 (FIG. 15). One may temporarily suspend GPS tracking and deviate from the flight plan by using the Left key 346 (FIG. 9) or the Right key 345 (FIG. 9) of the user interface 54*d*, to steer the aircraft to a desired heading. While suspended, pressing the NAV key 331 (FIG. 9) will restore flight plan tracking. Input to the GPS tracking control loop 381 includes data received from the GPS while a flight plan or GoTo is active. The autopilot system 50 follows the flight plan course by automatically adjusting the ailerons deflection angle 371, steering a precise ground track, and turning to a new desired course at designated waypoints. If, while tracking, GPS flight plan data from the GPS is corrupt or lost, then the autopilot system 50 automatically reverts to the Wing Leveler (W-LVLR) operational mode to maintain level wings and the current heading. Once GPS data is restored, the autopilot system 50 automatically resumes tracking the flight plan by intercepting and following it.

In this and other embodiments, the objective of this control loop 381 is to automatically set the deflection of the aircraft's ailerons to an amount which will result in the aircraft flying a pre-programmed direction, or desired ground track 390, to intercept and track the desired course 383. The GPS tracking control loop 381 inputs include a ground speed 382, a desired course 383, and a cross-track error 384. The outcome is ground-track 374 (FIG. 13), which corresponds with great accuracy to the desired ground-track 390. The control loop 381 is implemented in both algorithmic and electromechanical means, comprising an intercept calculator 385, algorithms, and the heading control loop 372, discussed in conjunction with FIG. 13. It is necessary to have a GPS with an active flight-plan or GoTo to utilize the GPS tracking control loop 381. A desired ground-track 390 is calculated by the intercept calculator 385 the value of which is applied to the heading control loop 372 as a desired heading or ground-track 373 input, which, by means of ailerons deflection, steers the aircraft to fly the desired ground-track 390. The Intercept calculator 385 algorithm calculates a varying desired ground-track 390 which is the most efficient path for the aircraft to acquire and maintain the desired course 383. It also calculates a threshold cross-track error beyond which the desired ground-track 390 is at a 45-degree (intercept) angle relative to the desired course 383. Below the threshold the desired ground-track 390 diminishes asymptotically, as the aircraft gets closer to the desired course 383. This threshold cross-track distance is proportional to the ground speed 382 by a predetermined relation.

Still referring to FIG. 14, in this and other embodiments, the desired ground-track 390, is calculated by the intercept calculator 385, using the desired course 383, aircraft ground speed 382, and aircraft distance from intended course, or cross-track error 384. The resulting desired ground track 390 is applied as the desired heading or ground track 373 to the heading control loop 372 to automatically control aircraft ground-track 374. If the aircraft is a distance from the desired course 383 that exceeds a pre-calculated cross-track error 384 threshold value, which is proportional to the ground speed of the aircraft, the desired ground-track 390 is set at a 45° (intercept) angle relative to the desired course. For smaller deviations, the intercept angle asymptotically diminishes to 0° (on course). In a multi segment flight plan, the aircraft is automatically turned by the autopilot system 50 to a new course segment at the specified way-point in a smooth and controlled manner. This produces a smooth and efficient course intercept, accurate course tracking, and pleasant turns.

Referring to FIG. 15, an example of a GPS flight plan is shown. It includes flight plan origin 392 point, two waypoints, and a flight plan destination 386. Each of the three segments of this flight plan has a different desired course 383 angle. At the indicated position of the aircraft 393 it follows a desired ground-track 390 corresponding to a 45 degree intercept 391 relative to the desired course 383, which is the first segment of the flight plan. At its position in the 45 degrees intercept 391 region, it will hold this ground-track heading because its distance from the intended course (its Cross-track error 384) is greater than the intercept threshold 388. The desired ground track 390 line indicates that once the aircraft 393 is within the intercept threshold 388, it flies an asymptotic intercept 389 ground-track, with diminishing intercept angle, until its ground-track coincides with the desired course 383. Once on course, it will be tracking 394 the desired course 383, meaning the desired ground-track will coincide with the desired course 383. When it arrives at waypoint B 387, the autopilot system 50 automatically turns the aircraft 393 to the new desired course 383, corresponding to the second segment of the flight plan. The intercept threshold 388 is directly proportional to the aircraft ground speed. With newer technology GPS units, data provided to the autopilot system 50 allows it to perform a fly-by ground track, where it will begin the turn to a new flight plan segment heading slightly before it arrives at the changeover waypoint, rounding the turn for a smoother, more efficient flight performance. The point at which it begins the turn depends on the ground speed of the aircraft and the amount of turn required. Older GPS units only provide a fly-over type performance, where the turn to a new flight plan segment heading follows arrival at the waypoint. The autopilots system 50 is capable of handling both fly-by and fly-over methods.

FIG. 16 shows a flowchart of the control unit's process for operating the control circuit 54*b*, according to an embodiment of the invention. Each of FIGS. 17-19 shows a schematic view of a portion of the control circuit 54*b* that corresponds to one of three operational modes, each according to an embodiment of the invention.

The control unit 54*c* monitors the user interface 54*d* for information that changes the input parameters of the control circuit 54*b*, such as a change in operational modes; or a change in a parameter within the operational mode currently in use, such as a change in a desired elevator deflection or desired rate of change in altitude. The control unit 54*c* then invokes the appropriate algorithm to effect the desired control of the aircraft.

The control circuit 54*b* includes a servo circuit 401 (FIG. 17) that applies force to the yoke 52, and includes the motor 146 (FIG. 3). The control circuit 54*b* also includes three selectable operational (or ALT) modes: 1) Manual mode; 2) Altitude Hold (HOLD) mode; and 3) Suspended Altitude Hold mode. Each of the operation modes includes an algorithm that determines when and to what extent the aircraft's elevator should be moved to provide a desired flight trajectory. After this has been determined, the control unit 54*c* uses the servo circuit 401 to power the motor 146 to effect the change in the position of the aircraft's elevator. The Manual operational mode is discussed in greater detail in conjunction with FIG. 17. The Altitude Hold (HOLD) operational mode is discussed in greater detail in conjunction with FIG. 18. And the Suspended Altitude Hold operational mode is discussed in greater detail in conjunction with FIG. 19.

Referring to FIG. 16, the flowchart shows a pitch axis control loop that the control unit 54*c* executes as frequently as desired. For example, in this and other embodiments, the control unit 54*c* executes the loop every 80 milliseconds to determine whether or not the deflection of the aircraft's elevator should be changed. On entry of the Update pitch axis control loop 8400, a selection is made between Manual and Altitude Hold (HOLD) modes 8500. If in Manual mode, and input from the Up key 344 (FIG. 9) is detected 8600, the desired elevator deflection amount is increased 1190, else if input from the Down key 339 (FIG. 9) is detected 9300 then the deflection amount is decreased 1200. An increase in elevator deflection implies tilting the aircraft's nose up. If no key input is detected, no change is made, and the event is terminated 9500. Following each increase or decrease in elevator deflection 1190, 1200, the pitch motor drive level and direction is calculated 1210 and scaled by pitch gain 1220 while considering the limits in pitch angle 1230 and presently set elevator deflection 1800. Then, power is applied to the motor 146. If not in Manual mode 8500, but rather in Suspended Altitude Hold 900 mode, and input from the Up key 344 is detected 9200, then the desired vertical speed is increased by 100 feet per minute (fpm) 8900 (or some other value which is deemed appropriate as preselected by the pilot). If input from the Down key 339 is detected 9600, then the vertical speed is reduced by 100 fpm 9100. If no key input is detected, the currently set desired vertical speed is maintained. Then, the desired vertical speed is compared 8700 with the measured vertical speed, and if the measured vertical speed is greater, then the desired deflection amount is decreased 1200 proportionally to the difference of these two values; else it is increased 1190 proportionally. The deflection amount is then converted to an appropriate motor drive level 1210 by applying pitch gain 1220 and comparing to the current elevator deflection 1800, while observing pitch angle limit 1230. Then the calculated amount of power is applied to the motor 146 (FIG. 3). If the Altitude Hold mode is not suspended 900, then the measured altitude is compared to the pre-determined desired altitude 9000. If the measured altitude (present altitude of the aircraft) is greater than the desired altitude, then the elevator deflection amount is decreased 1200 in order to lower the aircraft nose and descend to the desired altitude. Otherwise, the elevator deflection amount is increased 1190 in order to climb back to the desired altitude. The speed of the motor 146 while correcting altitudes or climb rates is proportional to the amount of error detected in performing the comparisons of altitude 9000 and climb rates 8700 respectively.

Referring to FIG. 17, the servo circuit 401 may be configured and invoked as desired. For example, in this and other embodiments, the servo circuit 401 is invoked when any of the three operational modes are selected and the control unit 54*c* determines that the elevator's deflection should be changed. When in the Manual operational mode this is done by pressing the Up key 344 (FIG. 9) or the Down key 339 (FIG. 9) of the user interface 54*d*. The input information is connected numerically to the input of the servo circuit 401, which directs the motor 146 to move the yoke 52 to effect the desired change in the elevator's deflection.

In this and other embodiments, the objective of the servo circuit 401 is to set the deflection of the aircraft's elevator 409 to a pre-determined desired deflection amount 403. The input to this control loop is a numerical desired deflection amount 403 and its effect is to set the deflection of the aircraft's elevator 409 to that amount. It is implemented in both algorithmic and electromechanical means, comprising a Pitch servo difference function 402, a Pitch motor drive algorithm 405, Pitch motor drive electronics 408, and the motor 146. The difference between the numeric value of the desired deflection amount 403 and the elevator's actual deflection angle 406, which is measured by the elevator position sensor 158 (FIG. 3), provides a numeric representation of the pitch deflection error 404, which is converted to a proportional motor drive value by the Pitch motor drive algorithm 405. The numerical result of the algorithm is amplified by the Pitch motor drive electronics 408, whose output powers motor 146. As discussed in conjunction with FIGS. 2 and 3, the motor 146 moves the yoke 52 (FIG. 1), and the elevator's deflection angle 406 is measured by the elevator deflection sensor 158.

Referring to FIG. 18, the altitude hold control loop 417 may be configured as desired to maintain the aircraft at a constant altitude. It may be invoked when the Altitude Hold (HOLD) operational mode is selected. In this and other embodiments, the objective of this control loop 417 is to automatically adjust the deflection of the aircraft's elevator 409 to an amount which will result in the aircraft maintaining a desired altitude 415. The desired altitude 415 may be determined and stored in the autopilot system's memory when the pilot selects the Altitude Hold mode by pressing the ALT key 343 (FIG. 9) of the User interface 54*d* while the pitch axis system is in Manual mode. Alternatively, the desired altitude 415 may be determined and stored in the autopilot system's memory when the pilot exits the Suspended Altitude Hold mode (or vertical speed control) by pressing the ALT key 343 of the user interface 54*d* while in vertical speed control mode. The mechanism of this loop 417 is implemented in both algorithmic and electrical circuitry means, comprising, a Altimeter sensor 410, GPS altitude 411 data, an Altitude source selector 412, an Altitude difference function 422, a Pitch axis gain 416, a Pitch converter 421, a Pitch axis limiter 418 and a Pitch axis servo control loop 401. The aircraft's present altitude 413 is determined from either, the GPS altitude 411 data, if such is available, or from the Altimeter sensor 410, as automatically selected by the Altitude source selector 412. The aircraft's present altitude 413 is subtracted from the desired altitude 415 by the Altitude difference function 422, resulting in an Altitude error 414, which is scaled by a predetermined Pitch gain 416 and converted by the Pitch converter 421 to a proportional elevator deflection value. This is then numerically limited by the Pitch axis limiter 418 and input to the servo circuit 401 as a desired elevator deflection amount 403. As previously described, the servo circuit 401 sets the elevator deflection angle 420 to the desired elevator deflection amount 403. The Pitch axis limiter 418 imposes several predefined limits, which includes a rate of pitch limit, a pitch angle limit, and an elevator deflection angle limit.

Still referring to FIG. 18, the default value of the Pitch axis gain 416 is predetermined for each aircraft type and model to provide optimal performance of the altitude hold control loop 417 in terms of both, stability and response time. This value is automatically loaded when selecting aircraft type and model, by using the setup facility provided in the autopilot system 50. This value may be edited by the pilot to modify the performance as preferred by the pilot. This value is saved in non-volatile memory and reloaded anytime the autopilot system 50 powers up. Reducing the default Pitch axis gain 416 results in a more sluggish aircraft response to climb and descend commands, as well as lower altitude setting accuracy, while increasing it results in a quicker response, or jittery under-damped response or even hunting or oscillations in pitch attitude. By default, while in Altitude Hold mode, the autopilot system 50 limits climb and descent rates to 700 fpm. The pilot may modify this rate by editing it using the setup operation of the autopilot system 50.

Referring to FIG. 19, the suspend altitude hold control loop 419 may be configured as desired and may be invoked when the Altitude Hold (HOLD) operational mode is selected. While in Altitude Hold mode, the pilot may suspend this mode and set a desired vertical speed 425 to commence a climb or a descent. To enter this Suspended Altitude Hold mode (vertical speed mode) the pilot presses either the Up key 344 or the Down key 339 of the user interface 54*d* while in Altitude Hold mode. The user interface 54*d* indicates the Suspended Altitude Hold mode, as well as displaying the target or desired vertical speed. While in the suspended mode the vertical speed is determined by use of the Up key 344, which increases the vertical speed, and the Down key 345 which reduces the vertical speed. Repeated key entry of these keys adjusts the vertical speed incrementally in steps of 100 fpm. While in the suspended mode, pressing the ALT key 343 exits the suspended mode, setting the desired altitude 415 value to the aircraft's present altitude 413, and resuming normal Altitude Hold operation.

In this and other embodiments, the objective of this control loop 419 is to set a desired vertical speed 425. It automatically adjusts the deflection of aircraft's elevator 409 to an amount resulting in the desired vertical speed 425. The amount of the desired vertical speed 425 is manually entered by the pilot while in Suspended Altitude Hold mode. This loop 419 is implemented in both algorithmic and electrical circuitry means, comprising an Altimeter sensor 410, GPS altitude 411 data, an Altitude source selector 412, a Vertical speed difference function 427, a Vertical speed gain 429, a Vertical speed converter 430, a Pitch axis limiter 418 and a Pitch axis servo control loop 401. The aircraft's present altitude 413 is selected from either, the GPS altitude 411 source, if available, or from the Altimeter sensor 410. The aircraft's present altitude 413 is then converted to the aircraft's present vertical speed 424 by the differentiator 426. The vertical speed 424 is then subtracted from desired vertical speed 425 by the Vertical speed difference function 427. The result is the error in vertical speed 428, which is then scaled by a predetermined Vertical speed gain 429 and converted by the Vertical speed converter 430 to a proportional elevator deflection value. This is then input to the Pitch axis limiter 418 resulting in a desired elevator deflection amount 403 which is translated to Elevator deflection angle 420 by the servo circuit 401. This moves the aircraft's elevator 409 to the desired elevator deflection amount 403. The Pitch axis limiter 418 imposes several predefined limits; including rate of pitch limit, pitch angle limit, and elevator deflection angle limit.

The control circuit 54*b* also includes trim enunciators 330 (FIG. 9) to indicate elevator trim requirements. They indicate to the pilot the direction of the trim adjustment to be made. When in trim, both, the up arrow 330*a* and the down arrow 330*b* trim indicators are extinguished, meaning no trimming is required. When the up arrow 330*a* enunciator is illuminated, it is an indication to the pilot to trim for nose up attitude. When the down arrow 330*a* enunciator is illuminated, it is a sign that a nose down trim control is required. The pilot should trim until both lights are turned off. If a significant elevator trim adjustment is required, the respective enunciators will flash.

Trimming the aircraft elevator is important for several reasons. The motor 146 has limited force and is not capable of applying enough force to make large pitch attitude adjustments. When the elevator is properly trimmed, a small force from the motor 146 is usually required to maintain a target altitude. Also, if the aircraft is properly trimmed, disengaging the autopilot system 50 will not result in an unpleasant, abrupt pitch change.

The trim indicator operates whenever the autopilot system 50 is engaged. The Control unit 54*c* measures the trim status and sets the enunciators 330*a* and 330*b* in the user Interface 54*d* accordingly. The trim sense system measures the amount and direction of force applied by the control circuit 54*b* onto the yoke 52 (FIG. 1). The linkage between the elevator actuation mechanisms may include a flexible element, such as a spring or some other flexible element, such as a rubber band, that responds to force by stretching proportionally to the force applied. A position sensor translates the amount of movement into an electrical signal. This signal is then measured at a rate of three times per second by the control unit 54*c*. In this and other embodiments, the trim sensor can be mounted on the linear slide part of the autopilot system, or at another position on the autopilot system 50 to provide an electrical or mechanical indication of the amount of force applied to the elevator. Such other embodiments can be mechanical indicators that express this force by a moving pointer or dial. A further embodiment can also include a load cell to measure the force, which may be provided electrical excitation, and whose signal may be measured by the control unit 54*c*.

Since elevator trim is essential, a redundant detection system is included, which also provides an indirect indication of elevator trim. In this embodiment and others, the elevator motor currents are measured in both, elevator down and up movements. These currents reflect the torque, or force applied. The control unit 54c performs these measurements at a rate of three times per second and saves the averaged values of these currents. Comparing the magnitudes of the currents as well as their difference provides an indication of trim requirements. This method serves as the backup for the sensor apparatus, and is utilized if the latter is diagnosed to be erroneous.

Each of FIGS. 20, 21A-21C, 22A, 22B, 23A and 23B shows a flowchart of a process that the autopilot system shown in FIGS. 1 and 7-19 follows, each according to an embodiment of the invention. FIG. 20 shows a process that the control unit 54c uses to scan the user interface 54d for information input via the user interface's keys. FIG. 21 shows three different processes that the control unit 54c uses to update inertial information of the aircraft. FIG. 22 shows a process that the control unit 54c uses to update information on the aircraft's roll, and another process that the control unit 54c uses to update information on the aircraft's pitch. FIG. 23 shows a process that the control unit 54c uses to update information on the aircraft's altitude and flight direction.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A method for controlling the flight of an aircraft via an autopilot system, the method comprising:
   releasably mounting to an airframe of said aircraft a first coupler of a device that holds a component of an autopilot control circuit;
   releasably mounting to a flight control component of the aircraft a second coupler of the device; and
   moving a first portion of a frame of the device relative to a second portion of the device's frame, wherein the frame's first portion is releasably fastened to the first coupler, and the frame's second portion is releasably fastened to the second coupler.

2. The method of claim 1 wherein releasably mounting the second coupler of the device includes releasably mounting the second coupler to a control yoke of the aircraft's flight control component.

3. The method of claim 1 wherein releasably mounting the second coupler of the device includes releasably mounting the second coupler to a stick of the aircraft's flight control component.

4. The method of claim 1 wherein releasably mounting the first coupler of the device to the airframe of said aircraft includes clamping the first coupler to the airframe.

5. The method of claim 1 wherein releasably mounting the second coupler of the device to the flight control component includes clamping the second coupler to the flight control component.

6. The method of claim 1 wherein the frame's second portion is configured to slide relative to the frame's first portion while the second coupler is releasably fastened to the frame's second portion.

7. The method of claim 1 further comprising unfastening the frame from at least one of the couplers, while the component of the autopilot control circuit controls the flight of the aircraft, to stop the component's control of the aircraft.

* * * * *